(12) United States Patent
Bois et al.

(10) Patent No.: US 12,534,974 B2
(45) Date of Patent: Jan. 27, 2026

(54) SYSTEMS AND METHODS TO PLACE A THERMALLY CONDUCTIVE SHEATH IN A GEOTHERMAL WELL

(71) Applicant: XGS Energy, Inc., Palo Alto, CA (US)

(72) Inventors: Axel-Pierre Bois, Curis-au-Mont-d'Or (FR); Anthony Badalamenti, Katy, TX (US)

(73) Assignee: XGS Energy, Inc., Palo Alto, CA (US)

( * ) Notice: Subject to any disclaimer, the term of this patent is extended or adjusted under 35 U.S.C. 154(b) by 0 days.

(21) Appl. No.: 19/047,474

(22) Filed: Feb. 6, 2025

(65) Prior Publication Data

US 2025/0250879 A1    Aug. 7, 2025

Related U.S. Application Data

(60) Provisional application No. 63/725,312, filed on Nov. 26, 2024, provisional application No. 63/636,073, filed on Apr. 18, 2024, provisional application No. 63/550,959, filed on Feb. 7, 2024, provisional application No. 63/550,937, filed on Feb. 7, 2024.

(51) Int. Cl.
| | |
|---|---|
| *E21B 33/14* | (2006.01) |
| *C09K 5/14* | (2006.01) |
| *C09K 8/504* | (2006.01) |
| *E21B 43/10* | (2006.01) |

(52) U.S. Cl.
CPC ............... *E21B 33/14* (2013.01); *C09K 5/14* (2013.01); *C09K 8/5045* (2013.01); *E21B 43/10* (2013.01)

(58) Field of Classification Search
CPC .......... E21B 33/14; E21B 43/10; C09K 5/14; C09K 8/5045
See application file for complete search history.

(56) References Cited

U.S. PATENT DOCUMENTS

| | | | |
|---|---|---|---|
| 827,437 A | 7/1906 | Giles | |
| 3,058,909 A | 10/1962 | Kern | |
| 3,163,219 A | 12/1964 | Wyant et al. | |
| 4,912,941 A | 4/1990 | Buchi | |
| 5,320,172 A * | 6/1994 | Jennings, Jr. .......... | C09K 8/424 166/291 |

(Continued)

FOREIGN PATENT DOCUMENTS

| | | |
|---|---|---|
| CA | 3230116 A1 | 3/2023 |
| CN | 210267786 U | 4/2020 |

(Continued)

OTHER PUBLICATIONS

U.S. Appl. No. 63/239,250.

(Continued)

*Primary Examiner* — Catherine Loikith
(74) *Attorney, Agent, or Firm* — Martin Fessenmaier; Priti Phukan; Umberg Zipser LLP

(57) ABSTRACT

Various systems and methods are presented for placing a multi-segmented thermally conductive sheath around a closed-loop heat harvesting system in of a geothermal well for purposes of improved electrical or thermal energy generation and recovery. The systems and methods presented herein additionally allow for a more efficient means of installing a thermally conductive sheath at the extreme depths and temperatures of typical geothermal well target locations.

10 Claims, 9 Drawing Sheets

(56) References Cited

U.S. PATENT DOCUMENTS

| | | | |
|---|---|---|---|
| 6,098,711 A * | 8/2000 | Chatterji | C09K 8/42 166/292 |
| 6,251,179 B1 | 6/2001 | Allan | |
| 6,668,554 B1 | 12/2003 | Brown | |
| 6,672,371 B1 | 1/2004 | Amerman et al. | |
| 7,067,004 B2 | 6/2006 | Matula et al. | |
| 7,452,417 B2 | 11/2008 | Matula et al. | |
| 8,584,753 B2 | 11/2013 | Fitzpatrick et al. | |
| 8,616,000 B2 | 12/2013 | Parrella | |
| 8,640,772 B2 | 2/2014 | Bour et al. | |
| 9,091,460 B2 | 7/2015 | Parrella, Sr. | |
| 9,376,885 B2 | 6/2016 | Bour et al. | |
| 9,845,423 B2 | 12/2017 | Frantz et al. | |
| 9,896,619 B2 | 2/2018 | Nguyen et al. | |
| 10,113,106 B2 | 10/2018 | Wadekar | |
| 10,414,966 B2 | 9/2019 | Brown et al. | |
| 10,954,924 B2 | 3/2021 | Moncarz et al. | |
| 11,085,671 B2 | 8/2021 | Gheysens | |
| 11,125,471 B2 | 9/2021 | Marsh et al. | |
| 11,220,882 B2 | 1/2022 | Nevison et al. | |
| 11,299,970 B2 | 4/2022 | Cook | |
| 11,656,002 B2 | 5/2023 | Nevison et al. | |
| 12,123,406 B2 | 10/2024 | Arefi | |
| 12,228,111 B2 | 2/2025 | Arefi | |
| 2003/0187583 A1 | 10/2003 | Martin et al. | |
| 2006/0210631 A1 | 9/2006 | Patel et al. | |
| 2007/0125274 A1 | 6/2007 | Miller | |
| 2007/0163805 A1 | 7/2007 | Trevisani | |
| 2008/0223041 A1 | 9/2008 | Reynolds | |
| 2009/0211757 A1 | 8/2009 | Riley | |
| 2010/0276115 A1 | 11/2010 | Parrella | |
| 2011/0232858 A1 | 9/2011 | Hara | |
| 2012/0247766 A1 | 10/2012 | Hemmings | |
| 2014/0158354 A1 | 6/2014 | Kumar et al. | |
| 2020/0191444 A1 | 6/2020 | Nevison et al. | |
| 2021/0071063 A1 | 3/2021 | Stone | |
| 2021/0348804 A1 | 11/2021 | Marsh et al. | |
| 2021/0356174 A1 | 11/2021 | Alharbi et al. | |
| 2021/0396430 A1 | 12/2021 | Cook et al. | |
| 2024/0228868 A1 | 7/2024 | Werries et al. | |
| 2024/0271831 A1 | 8/2024 | Arefi | |
| 2024/0337254 A1 | 10/2024 | Arefi | |
| 2024/0353051 A1 | 10/2024 | Ring et al. | |
| 2024/0368996 A1 | 11/2024 | Arefi | |
| 2025/0032974 A1 | 1/2025 | Arefi | |

FOREIGN PATENT DOCUMENTS

| | | |
|---|---|---|
| CN | 111442549 A | 7/2020 |
| TW | 202331098 A | 8/2023 |
| WO | 2014092940 A1 | 6/2014 |
| WO | 2015159188 A2 | 10/2015 |
| WO | 2021257923 A1 | 12/2021 |
| WO | 2022018674 A1 | 1/2022 |
| WO | 2023034425 A1 | 3/2023 |
| WO | 2023069703 A1 | 4/2023 |
| WO | 2023150450 A1 | 8/2023 |
| WO | 2023150452 A1 | 8/2023 |
| WO | 2023150466 A1 | 8/2023 |
| WO | 2024044251 A1 | 2/2024 |

OTHER PUBLICATIONS

International Search Report and Written Opinion for PCT Application No. PCT/US2024/054606 dated: Feb. 20, 2025, 14 pages.
First Examination Statement for TW Application No. 114104404, dated Aug. 26, 2025, 12 pages (Machine English Translation).
English Translation of CN210267786U, 9 pages.
English Translation of CN111442549A, 6 pages.

* cited by examiner

SYSTEMS AND METHODS TO PLACE A THERMALLY CONDUCTIVE SHEATH IN A GEOTHERMAL WELL

This application claims priority to US provisional patent applications with Ser. No. 63/550,937, which was filed Feb. 7, 2024; Ser. No. 63/550,959, which was filed Feb. 7, 2024; Ser. No. 63/636,073, which was filed Apr. 18, 2024; and the Ser. No. 63/725,312, which was filed Nov. 26, 2024; all of which are both incorporated by reference herein.

FIELD OF THE INVENTION

The field of the invention is systems and methods of improving thermal conductivity of a geothermal well, especially as it relates to placing a multi-segmented thermally conductive sheath into an annular space of a well bore for purposes of enhancing electrical and thermal energy generation.

BACKGROUND OF THE INVENTION

The background description includes information that may be useful in understanding the present invention. It is not an admission that any of the information provided herein is prior art or relevant to the presently claimed invention, or that any publication specifically or implicitly referenced is prior art.

All publications and patent applications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

A geothermal well may be a newly drilled, 'greenfield' well or an abandoned or otherwise retired or suspended ('brownfield') well, which are typically located within a known or operating geothermal field. However, geothermal plants may also be placed on wells originally drilled and used for hydrocarbon production, provided the well is in a location with sufficient geothermal heat resource. Most typically, heat resources will have a temperature in a target zone between 120° C. to 600° C. and are often at a depth exceeding 150 meters.

However, even though various systems and methods for geothermal heat harvesting are known in the art, all or almost all of them suffer from several drawbacks, especially as it relates to efficiency of thermal energy transfer from the target zone to a working fluid of a heat harvester. Among other issues, thermal energy transfer within the well (i.e., from the target formation to the heat harvester) may present a rate-limiting step. Therefore, there remains a need for new and/or improved systems and methods for a thermally conductive sheath in a geothermal well that efficiently thermally couples the target formation to the heat harvester, especially where the target zone extends over a significant distance.

SUMMARY

The inventive subject matter is directed to systems and methods for placing a multi-segmented TRE (thermal reach enhancement) sheath into a wellbore such that a TRE sheath having a thermal conductivity of at least 5 W/mK is achieved in a target production zone.

In one aspect of the inventive subject matter, the inventor contemplates a method of placing a TRE sheath into a wellbore in stages that includes pumping a TRE mixture into an annular space of the wellbore, wherein the TRE mixture comprises a plurality of thermal reach enhancement (TRE) particles and carrier fluid that suspends the particles, settling the TRE particles in the annular space of the wellbore, optionally removing the carrier fluid from the TRE mixture, consolidating the remaining TRE particles to thereby form a thermally conductive and compacted TRE sheath in the wellbore, and wherein the step of pumping the TRE mixture, and/or the step of settling the TRE mixture, and/or the step of removing the carrier fluid, and/or the step of consolidating the remaining thermally conductive material is repeated in at least two stages.

In various embodiments, the plurality of TRE particles is selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and optionally wherein the thermally conductive material comprises at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy.

Preferably, the carrier fluid comprises water or fluid carbon dioxide. In some embodiments, the carrier fluid is a high apparent viscosity fluid with a composition that allows an additive or triggering event to change physical and/or chemical properties of the mixture in situ to thereby reduce viscosity and allow the thermally conductive material to settle via gravity.

Most typically, placing a TRE sheath in stages uses a differential valve process, a perf-and-plug process, a liner/tieback process, a sedimentation process, or an external tubing process, and/or wherein a cement mixture follows placement of the TRE mixture as a tail to seal the annular space. However, and regardless of the manner of placement, the step of placing is preferably done in a staged manner.

Moreover, in some embodiments removing the carrier fluid may use an external tubing process, a stimulation-based process, a vaporization process, a grooved casing process, or a casing vibration process.

It is generally contemplated that the TRE sheath is placed at a depth of between 150 m and 20,000 m below the surface. It is further generally contemplated that the TRE sheath is placed at a location with a geostatic temperature of between 120° C. and 600° C. In some embodiments, the TRE sheath has a vertical length of at between 10 m and 10,000 m. In further embodiments, settling and/or consolidating takes at least 24 hours to form a segment of the TRE sheath. In yet additional embodiments, the TRE sheath has a thermal conductivity of between 5 W/mK and 400 W/mK. Preferably, the TRE sheath has a permeability of equal or less than 10 Darcy. It is additionally important that the TRE sheath is configured to be flexible for movement with subsurface rock.

Preferably, the TRE mixture has an increased concentration of the TRE solid. As will be readily appreciated, the TRE mixture with the increased concentration of TRE particles may be pumped in one stage and does not need to settle. In some embodiments, the TRE particles are present in the TRE mixture in an amount greater than 50 wt % of the total weight of the TRE mixture.

In yet another aspect of the inventive subject matter, the inventors contemplate a method of placing a TRE sheath into a wellbore that includes feeding a TRE mixture comprising a plurality of thermal reach enhancement (TRE) particles and a carrier fluid that suspends the particles into an annular space between a liner and a wellbore wall using a top job process and settling, then consolidating, the TRE solid in the annular space, wherein the feeding, settling, and subsequent consolidating are performed over at least two cycles to thereby form a compacted TRE sheath in a target zone of the annular space.

Most typically, the top job process comprises inserting a small tube directly into the annular space, pumping a wash fluid through the small tube to clean residual fluids, and pumping the TRE mixture into the small tube to fill the annular space.

In some embodiments, consolidating the TRE mixture comprises hydraulic consolidation and/or chemical consolidation.

It is generally contemplated that the carrier fluid comprises a high apparent viscosity carrier fluid with a composition that allows an additive or triggering event to change physical and/or chemical properties of the mixture in situ to thereby reduce viscosity and thereby allow the TRE particles to settle via gravity at a target location.

Preferably, the plurality of TRE particles is selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and optionally wherein the thermally conductive material comprises at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy.

In many embodiments, the TRE sheath is placed at a depth of between 150 m and 20,000 m below the surface. It is further generally contemplated that the TRE sheath is placed at a location with a geostatic temperature of between 120° C. and 600° C. In some embodiments, the TRE sheath has a vertical length of at between 10 m and 10,000 m. In further embodiments, forming (a segment of) the compacted TRE sheath may take between 12 and 72 hours. In yet additional embodiments, the TRE sheath has a thermal conductivity of between 5 W/mK and 400 W/mK. Preferably, the TRE sheath has a permeability of equal or less than 10 Darcy.

Moreover, the step of feeding and/or settling and/or consolidating is performed until the TRE sheath covers at least 10% of the vertical height of the wellbore. Most typically, once a TRE sheath is formed, the small tube may be removed from the annular space. In further embodiments, the TRE sheath has some degree of flexibility so as to allow for movement with subsurface rock.

In another aspect of the inventive subject matter, the inventor contemplates a method of placing a TRE sheath into a wellbore that includes feeding a TRE mixture comprising a plurality of thermal reach enhancement (TRE) particles and a carrier fluid that suspends the particles into the annular space using a perf and plug process. The perf and plug process typically comprises pumping the TRE mixture into the annular space through a perforated casing, wherein the feeding and settling is performed over at least two cycles to thereby form the TRE sheath in a target zone of the annular space.

In various embodiments, the carrier fluid comprises a high apparent viscosity carrier fluid with a composition that allows an additive or triggering event to change physical and/or chemical properties of the mixture in situ to thereby reduce viscosity and thereby allow the TRE particles to settle via gravity at a target location.

Most typically, the perf and plug process further comprises removing the carrier fluid from the TRE mixture and plugging the perforated tube with cement.

As will be readily appreciated, allowing the TRE particles to settle further comprises consolidation of the TRE particles by hydraulic consolidation and/or chemical consolidation.

Preferably, the plurality of TRE particles is selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and optionally wherein the thermally conductive material comprises at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy.

It is generally contemplated that allowing the TRE particles to settle takes at least 24 hours. In yet additional embodiments, the TRE sheath has a thermal conductivity of between 5 W/mK and 400 W/mK. Preferably, the TRE sheath has a permeability of equal or less than 10 Darcy and is typically configured to be flexible for movement with subsurface rock.

Viewed from yet another perspective, the inventors additionally contemplate a method of forming a high-thermal conductivity compacted TRE sheath around a liner that is disposed in a wellbore at a target location within a geological formation. Most typically, this contemplated method includes installing a liner in the wellbore to form a first annular space, wherein the first annular space exists between the liner and the wellbore wall and begins at the bottom of the wellbore, attaching a tie back to an upper end of the liner to form a second annular space, wherein the second annular space exists between the tie back and the wellbore wall, and begins where the tie back and liner are attached, wherein the first annular space is fluidly coupled to the second annular space, feeding a mixture, comprising a plurality of thermal reach enhancement (TRE) particles and a high apparent viscosity carrier fluid that suspends the particles, through the second annular space into the first annular space to a height above the liner and below an upper end of the tie back, breaking viscosity of the mixture, waiting for a time sufficient to allow TRE particles to settle around the liner to thereby form a settled particle sheath, consolidating the settled particle sheath via hydraulic consolidation, and/or chemical consolidation, to thereby form a compacted TRE sheath, and, for the final step, optionally removing the tie back.

Preferably, the contemplated method further comprises repeating the step of installing, the step of attaching, the step of placing, the step of breaking, the step of waiting, the step of consolidating, and/or, for the final step, optionally removing until the compacted TRE sheath around the liner covers at least 10% of the vertical height of the liner.

In some embodiments, the liner and tieback is replaced with a casing. In various embodiments, the target location is at a depth of between 150 m and 20,000 m, and has a geostatic temperature of between 120° C. and 600° C. Moreover, the wellbore in the target location extends in a substantially vertical orientation.

It is generally contemplated that a flow path for the mixture comprises the first annular space around the liner and the second annular space around the tie back. Most typically, the flow path may have a length of at least 500 m. In some embodiments, the tie back has a vertical length of between 10 m and 5,000 m. In additional embodiments, the liner has a vertical length of between 10 m and 5,000 m.

In various embodiments, feeding the suspension requires conventional pumping, or reverse pumping, or top job pumping, or pumping with a control line. Preferably, pumping the mixture through the second annular space into the first annular space occurs at least once. Moreover, breaking the mixture allows the plurality of particles to settle within 24 hours around the liner. As will be readily appreciated, the settled particle sheath around the liner covers between 60% and 100% of the perimeter of the liner and has a vertical length of between 10% and 100% of the total length of the liner.

In some embodiments, the settled particle sheath is consolidated to form a compacted TRE sheath with a final porosity of equal or less than 80%. Most typically hydraulic consolidation is performed by removing pore fluid through hydraulic flow from the pores. Whereas chemical consolidation may be performed by consuming fluid by chemical reactions. After consolidation, the compacted TRE sheath may have a permeability of equal or less than 0.01 Darcy.

Preferably, the geological formation includes a plurality of thermal reach enhancement (TRE) structures that are at least partially filled with a high-thermal conductivity material, and wherein the high-thermal conductivity material in the TRE structures is thermally coupled with the settled TRE solid in the wellbore. As will be readily appreciated, the TRE structures typically have a wedge-shaped configuration in which a mouth of the TRE structure is wider than a distal end of the TRE structures.

Most typically, for this perspective, the step of installing a liner, and/or the step of attaching a tie back, and/or the step of feeding the mixture, and/or the step of breaking viscosity of the suspension to allow settling, and/or the step of waiting for the particles to settle, and/or the step of consolidating, and/or, for the final step, optionally removing the tie back is repeated at least twice.

Viewed from yet another perspective, the inventors contemplate a fluid removal enhancement (FRE) structure that includes a system configured to separate a carrier fluid from a plurality of settled TRE particles previously suspended by the carrier fluid, wherein the plurality of settled TRE particles are disposed in an annular space between a wall of a geothermal well and a casing or liner, wherein the system is configured to be fluidly coupled to an interstitial network between the settled TRE particles and fluidly coupled to a space outside the settled TRE particles to allow removing of the carrier fluid from the interstitial network to the space outside, and wherein removal of the carrier fluid enhances consolidation of the settled TRE particles.

In some embodiments, the FRE system comprises a partially perforated tubing or a casing with continuous axial grooves. Moreover, the partially perforated tubing or the casing with continuous axial grooves is disposed in a wellbore that descends substantially vertically from a topside location to a target location in a geological formation. As will be readily appreciated, the FRE system may also be part of a geological formation and allows draining of the carrier fluid into the formation via voids, pores, vugs, joints, a fracture, or a fault in the formation.

Preferably, perforations are made longitudinally along a tubing or casing prior to disposal into the geothermal well and/or wellbore. Most typically, the settled TRE particles have a porosity of equal or less than 80% and form a high thermal conductivity sheath with a thermal conductivity of between 5 W/mK and 400 W/mK.

Viewed from one more perspective, the inventor also contemplates a wellbore that includes a vertically or substantially vertically multi-segmented TRE sheath, wherein at least two segments comprise settled and compacted solid phase of a TRE mixture comprising a plurality of suspended thermal reach enhancement (TRE) particles and a carrier fluid that suspends the particles.

In some embodiments, the multi-segmented TRE sheath is fluidly coupled to a proximal mouth portion of a thermal reach enhancement (TRE) structure that extends from the wellbore distally into a geological formation at a target location.

Most typically, the carrier fluid comprises a high apparent viscosity carrier fluid with a composition that allows an additive or triggering event to change physical and/or chemical properties of the mixture in situ to thereby reduce viscosity and thereby allow the TRE particles to settle via gravity at a target location.

Preferably, the plurality of TRE particles is selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and optionally wherein the thermally conductive material comprises at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy.

It is generally contemplated that the TRE sheath is placed at a depth of between 150 m and 20,000 m below the surface. It is further generally contemplated that the TRE sheath is placed at a location with a geostatic temperature of between 120° C. and 600° C. In some embodiments, the TRE sheath has a vertical length of at between 10 m and 10,000 m. In further embodiments, the settled and compacted solid phase of the TRE particles may be achieved after between 12 and 72 hours. In yet additional embodiments, the TRE sheath has a thermal conductivity of between 5 W/mK and 400 W/mK. Preferably, the TRE sheath has a permeability of equal or less than 10 Darcy. It is additionally important that the TRE sheath is configured to be flexible for movement with subsurface rock.

Various objects, features, aspects, and advantages of the inventive subject matter will become more apparent from the following detailed description of preferred embodi-

DETAILED DESCRIPTION

Figure 1:
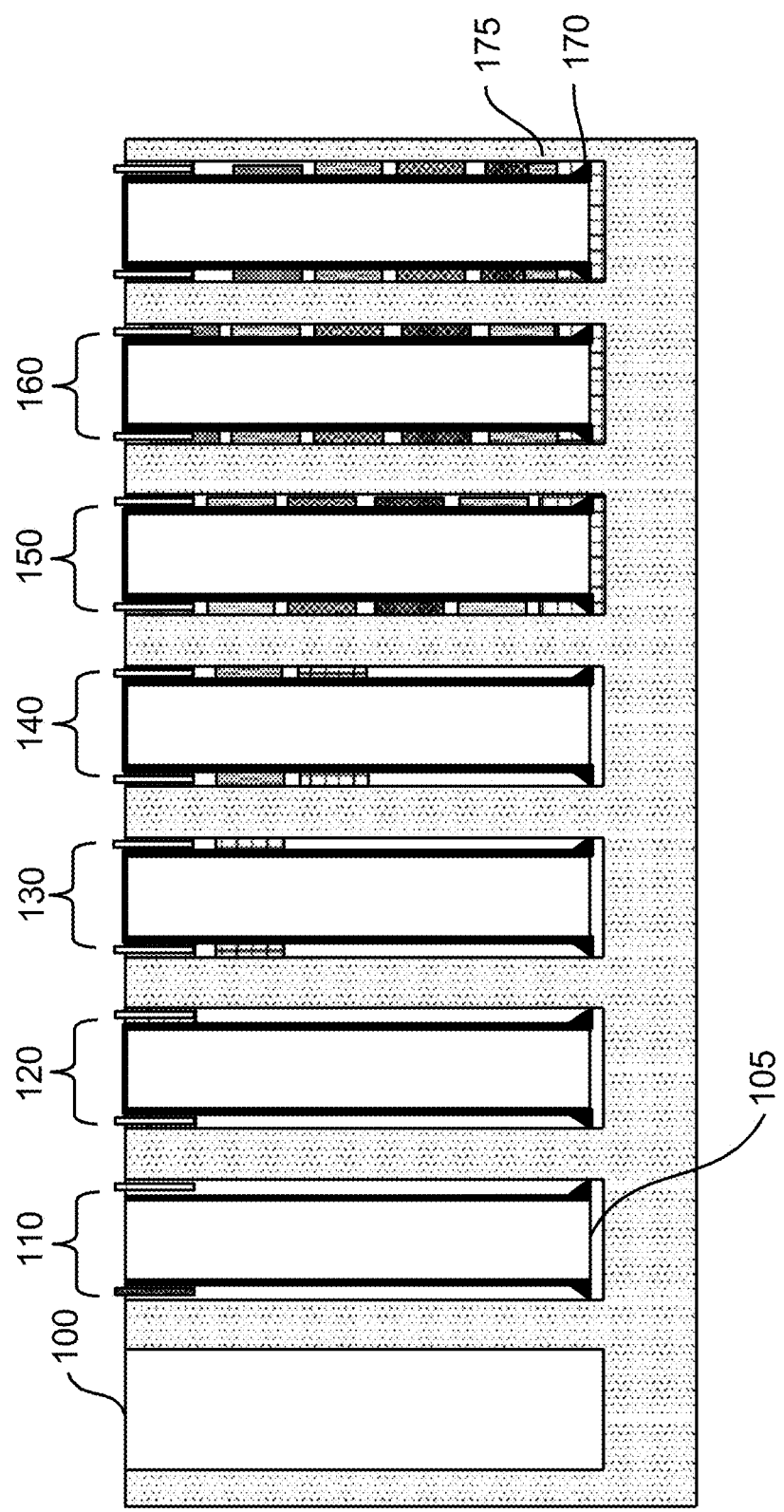
FIG. 1 is an exemplary schematic illustrating the steps required for pumping thermally conductive material in a top job manner.

In an effort to improve placement of a sheath that thermally couples the formation to the casing of the closed-loop system, few systems and methods are known. For example, in U.S. Pat. No. 11,656,002, it was disclosed that hydrocarbon-depleted wells could be redeployed to capture geothermal energy by creating a closed system in a single wellbore by hydraulically isolating a cemented and cased well through various means (i.e., settable material, a generic oilwell cement, mechanical means, a generic resin). Although interesting, this patent focuses only on hydraulic isolation and displacement of a reservoir fluid rather than ways to actually place an annular sheath. In addition, cement is utilized, which does not exhibit high-thermal conductivity and leads to a significant portion of the cementitious materials lacking thermal conductivity at best or acting as an insulator at worst.

In U.S. Pat. No. 8,584,753, a method of completing a subterranean well having an open wellbore extending through a subterranean formation having a target zone is presented. Therein, a tubing assembly is placed in the wellbore, extending through the target zone. A gravel pack is then placed in the annular space along at least a length of the target zone. A settable material may also be flowed into the annular space such that an annular barrier is created that is capable of holding a pressure differential. Unfortunately, such system is particularly for horizontal boreholes and does not provide an annular barrier that improves thermal conductivity of the subterranean well, nor was geothermal heat recovery even contemplated. In other words, the purpose of the settable annular barrier is to "complete" a subterranean well with an open well bore in a way that significantly reduces or stops annular flow in the borehole.

Nonetheless, advantageously, the inventors have discovered various systems and methods of multi-staged placement of a thermally conductive sheath around a closed-loop heat harvesting system in a geothermal well. The invention improves thermal conductivity of a subterranean well and thus geothermal electrical or thermal energy recovery. In addition, the contemplated multi-stage placement allows for a more efficient means of installing a thermally conductive sheath at the extreme depths and temperatures of typical geothermal well target locations.

In view of the above, it should therefore be appreciated that the systems and methods presented herein provide significant advancements in the field of thermal energy transfer in geothermic plants. In most contemplated scenarios, the energy produced by the geothermal well may be used for heating or cooling (direct use applications) or may be converted to electricity through use of a surface power plant for thermal-to-electric energy conversion. Moreover, geothermal systems may be integrated with equipment that consumes energy, e.g., a plant for hydrogen or other renewable fuel production, carbon capture, or desalination. The geothermal well may circulate working fluid and thereby continuously produce energy at a constant rate, or the flow rate of the working fluid may be controlled such that the well produces a time-variable amount of energy.

As contemplated herein, and will be discussed in more detail below, a complete geothermal system typically comprises a wellbore, a thermal reach enhancement (TRE) sheath, a casing, working fluid, and an insulated inner return tube, plus surface equipment. Most typically, the wellbore may comprise a vertically or substantially vertically multi-segmented TRE sheath formed from the settling and consolidation of TRE particles from a TRE mixture. Here, heat is transferred from the hot rock (possibly containing thermal reach enhancement (TRE) structures) to the compacted TRE sheath to the casing, and then to the working fluid. Hot working fluid is returned to the surface inside the inner return tube. At the surface, a heat exchanger with a second working fluid, which may have the same or different composition as the first working fluid, collects energy from the subsurface closed-loop circuit containing the first working fluid.

As will be discussed in more detail below, the thermally conductive mixture that is placed, referred to herein as the Thermal Reach Enhancement mixture, or TRE mixture, is composed of a plurality of thermally conductive materials, or TRE particles, (materials or mixtures of materials of which at least one component has a thermal conductivity larger than 5 W/m-K), a carrying fluid, and optionally surfactants and additives.

However, in terms of placing a TRE sheath into a wellbore, it is preferable that the placement is done in stages. Most typically the steps involve (a) pumping a TRE mixture into an annular space of the wellbore, wherein the TRE mixture again comprises a plurality of TRE particles and a carrier fluid that suspends the particles, (b) settling the TRE particles in the annular space of the wellbore, (c) optionally removing the carrier fluid from the TRE mixture, and (d) consolidating the TRE particles to thereby form a thermally conductive and resulting compacted TRE sheath in the wellbore, wherein the step of pumping the TRE mixture, and/or the step of settling the TRE mixture, and/or the step of removing the carrier fluid, and/or the step of consolidating the TRE particles is repeated in at least two stages. In some embodiments, the various steps of placing the TRE sheath into a wellbore may be repeated in at least two stages, in at least three stages, in at least four stages, in at least five stages, or more.

As used herein, the term "settled" involves the downward movement of the TRE particles under gravity. Where the TRE particles are generally moving from a previously suspended state in the high apparent viscosity carrier fluid to a settled mass state at the bottom of an annular space in a wellbore. As also used herein, the term "consolidated" involves the compaction of porous material upon a reduction of its pore pressure. Preferably, the porous material comprises the plurality of TRE particles. In some embodiments, consolidation may be hydraulic (where pore pressure decreases due to fluid flow according to Darcy) or consolidation may be chemical (where pore pressure decreases due to fluid consumption by chemical reactions). The consolidation process is typically initiated after the plurality of TRE particles are no longer suspended in the high apparent viscosity carrier fluid and after a sufficient settling time. Lastly, as additionally used herein, the term "compacted" describes the target final state of the high thermal conductivity compacted TRE sheath. This stage is achieved after the plurality of TRE particles undergo both the settling and consolidation processes, reaching a final desired state of porosity and thermal conductivity condition.

Returning to placement of the TRE sheath, it is preferable that the first step of pumping the TRE mixture uses a forward circulation process, a reverse circulation process, a casing movement process, a top-job process, or an external tubing process. For example, in terms of the top-job process, it is contemplated that pumping includes feeding the TRE mixture into an annular space between a liner and a wellbore wall using a top job process, settling and consolidating the TRE particles in the annular space, wherein the feeding and settling/consolidating are performed over at least two cycles to thereby form the TRE sheath in a target zone of the annular space. Most typically, the top job process involves inserting a small tube directly into the annular space, pumping a wash fluid through the small tube to clean residual fluids, and pumping the TRE mixture into the small tube to fill the annular space. Then once a TRE sheath segment is formed, the small tube may be removed from the annular space.

The next step of placement of the TRE sheath is the actual placing of the TRE mixture. Placing the TRE mixture most typically involves use of a differential valve process, a perf-and-plug process, a liner/tie-back process, or an external tubing process. However, the step of placing is preferably done in a staged manner. For example, in terms of the perf-and-plug process, it is contemplated that placing a TRE sheath into a wellbore includes feeding the TRE mixture into an annular space using a perf-and-plug process, wherein the perf and plug process comprises pumping the TRE mixture into the annular space through a perforated casing, and wherein the feeding and settling is performed over at least two cycles to thereby form the TRE sheath in a target zone of the annular space. More specifically, perf and plug typically involves perforating the wellbore liner or casing, pumping the suspension through the perforation, and placing a plug in each perforation to seal it (e.g., this plug could be made of cement, special patches, or an expanding liner). However, in some embodiments, the perforations may be preexisting. As will be readily appreciated, the perf and plug process may further comprise removing the carrier fluid from the TRE mixture.

In yet another example, involving the liner and tieback process, it is contemplated that forming a high-thermal conductivity compacted TRE sheath around a liner that is disposed in a wellbore at a target location within a geological formation may involve the steps of (a) installing a liner in the wellbore to form a first annular space, wherein the first annular space exists between the liner and the wellbore wall and begins at the bottom of the wellbore, (b) attaching a tie back to an upper end of the liner to form a second annular space, wherein the second annular space exists between the tie back and the wellbore wall, and begins where the tie back and liner are attached, wherein the first annular space is fluidly coupled to the second annular space, (c) feeding a mixture, comprising a plurality of TRE particles and a high apparent viscosity carrier fluid that suspends the particles, through the second annular space into the first annular space to a heigh above the liner and below an upper end of the tie back, (d) breaking viscosity of the mixture, (e) waiting for a time sufficient to allow TRE particles to settle around the liner to thereby form a settled particle sheath, (f) consolidating the settled particle sheath via hydraulic consolidation, and/or chemical consolidation to thereby form a compacted TRE sheath, and for the final step, (g) optionally removing the tie back.

Figure 9:
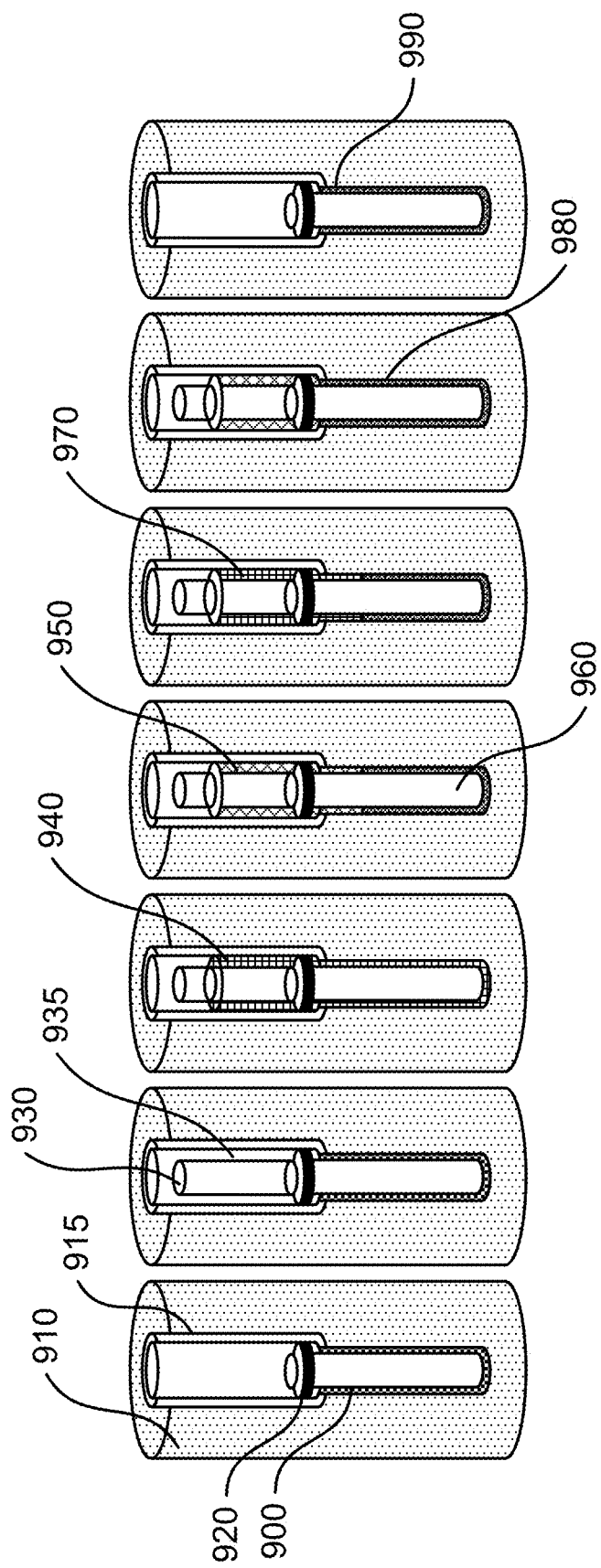
FIG. 9 is an exemplary schematic illustration of the placement of a TRE sheath within the first annular space around the liner using the liner/tieback method.

Viewed from another perspective, and as shown in FIG. 9, a liner or casing of a heat harvester may be disposed in the wellbore at a target location within a geological formation 910 in a substantially vertical orientation. Installation of the liner or casing in the wellbore will typically form a first annular space 900, where the first annular space exists between the liner and the wellbore wall and begins at the bottom of the wellbore. Preferably, a tie back 930 is attached to the upper end or portion of the first segment of the liner or casing to so form a second annular space 915, where the second annular space exists between the tie back and the wellbore wall and begins where the tie back and liner/casing are attached 920. The first annular space provided by the liner is fluidly coupled to the second annular space provided by the tieback. In various embodiments, the casing or liner and tie back form a flow path 935 for the pumpable suspension. The flow path may have a length of at least 50 m, at least 300 m, at least 400 m, at least 500 m, at least 600 m, at least 700 m, or at least 900 m.

After loading the flow path with the TRE mixture 940, which is typically done by conventional pumping, reverse pumping, top job pumping, or pumping with a control line, the carrier fluid may be broken 950 (e.g., using a chemical or enzymatic reaction, or using heat at the target zone) to allow the plurality of TRE particles to settle around the liner/casing 960. Preferably, the plurality of particles settles a distance of at least 1 m, or at least 5 m, or at least 10 m, or at least 20 m, or even higher within a time frame of at least or up to about 1 hour, at least or up to about 10 hours, at least or up to about 24 hours, at least or up to about 48 hours, or at least or up to about 72 hours. Settlement of the particles around the liner is achieved when a settled particle sheath covers at least 10%, at least 40%, at least 50%, at least 60%, at least 70%, at least 80%, or at least 100% of the perimeter of the liner. As well as when the settled particle sheath has a vertical length that spans at least 5%, at least 10%, at least 25%, at least 50%, at least 75%, or at least 100% of the total length of the liner. The process of pumping the TRE mixture through the second annular space into the first annular space may occur at least once, at least twice, or at least three times to achieve the desired vertical length of the TRE sheath. For example, as depicted in FIG. 9, the TRE mixture is pumped a second time 970 to the first and second annular spaces, where the TRE particles are permitted to settle 980 and may span the entirety of the first segment of the liner/casing 990 after subsequent consolidation. As will also be appreciated, at least partial removal of the carrier fluid after settling and/or consolidation of the particles can be implemented. The resulting compacted TRE sheath, after consolidation, most typically has a final porosity of equal or less than 20%, equal or less than 40%, or equal or less than 80%.

As will be readily appreciated, suitable tie backs may have a vertical length of at least 5 m, or at least 10 m, or at least 50 m, or at least 100 m, or at least 250 m, or at least 500 m, or at least 1,000 m, or at least 2,500 m, or at least 5,000 m. In some embodiments, a casing may be used in place of a liner/tieback. As such, suitable liners/casings may have a vertical length of at least 5 m, or at least 10 m, or at least 50 m, or at least 100 m, or at least 250 m, or at least 500 m, or at least 1,000 m, or at least 2,500 m, or at least 5,000 m.

Consequently, the various steps contemplated for achieving the compacted TRE sheath such as the steps of installing a liner, attaching a tie back, and/or the step of feeding the TRE mixture, and/or the step of breaking the viscosity of the TRE mixture to allow settling, and/or the step of waiting for the TRE particles to settle, and/or the step of applying consolidation are repeated at least once, at least twice, or at least three times to so incrementally increase the length of a TRE particle sheath such that the resulting TRE sheath thermally couples the liner or casing to the wellbore (and optionally also TRE structures in the wellbore). In many embodiments, the resulting compacted TRE sheath around the liner may cover at least 10%, at least 30%, at least 50%, at least 75%, at least 90%, or at least 100% of the vertical height of the liner.

The last step of placement of the TRE sheath involves removing the carrier fluid from the TRE mixture typically uses an external tubing process, a stimulation-based process, a vaporization process, a grooved casing process, or a casing vibration process. As used herein, the terms "draining" and "removing" may be used interchangeably to generally define the separation of the carrier fluid from the high thermal k material or TRE particles in the TRE mixture.

As will be readily appreciated, a fluid removal enhancement (FRE) structure may be implemented that typically involves a system configured to separate a carrier fluid from a plurality of settled TRE particles previously suspended by the carrier fluid. Most typically the system is configured to be fluidly coupled to an interstitial network between the settled TRE particles and fluidly coupled to a space outside the settled TRE particles to allow removing of the carrier fluid from the interstitial network to the space outside, and wherein removal of the carrier fluid enhances consolidation of the settled TRE particles.

Figure 8:
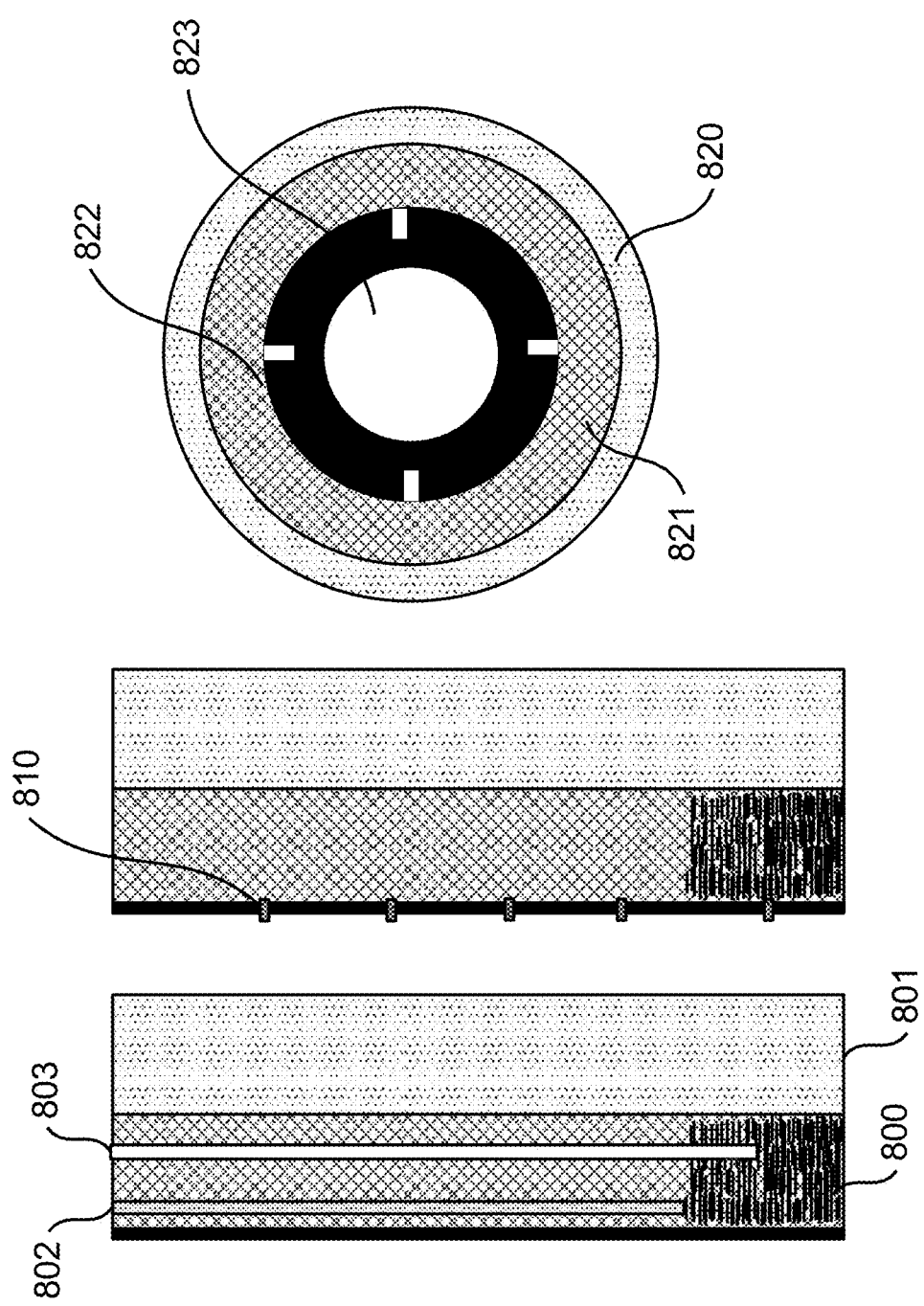
FIG. 8A is an exemplary schematic illustrating a fluid removal enhancement (FRE) structure that utilizes at least one control line inserted into the suspension to allow pumping and/or draining of the carrier fluid for enhancing consolidation of the settled particles.
FIG. 8B is an exemplary schematic illustrating another FRE structure that utilizes perforations along a tubing for enhancing consolidation of the settled particles.
FIG. 8C is an exemplary schematic illustrating yet another FRE structure that utilizes a casing with continuous axial grooves to allow draining of the carrier fluid for enhancing consolidation of the settled particles.

For example, as depicted in FIG. 8A, the plurality of settled TRE particles 800 may be disposed in an annular space 821 between a wall of a geothermal well 820 and a casing or liner 822 storing a working fluid 823. As shown in FIG. 8C, the FRE structure may include a partially perforated tubing and/or a casing with continuous axial grooves, to allow draining of the carrier fluid. In some embodiments, the FRE structure may also be part of the geological formation and allows draining into the formation via voids, pores, vugs, joints, a fracture, or a fault in the formation. In still other embodiments, the FRE structure may include at least one control line that is inserted into the suspension, to allow pumping 802 and/or draining 803 of the carrier fluid away from the interstitial network in the annular space 821 between the wellbore 801 and the liner/casing, as shown in FIG. 8A 822. Where desired, as depicted in FIG. 8B, the perforations 810 may be made longitudinally along a tubing prior to disposal into the geothermal well and/or wellbore. For example, perforations may be in the form of thousands of tiny pores that drip slowly and evenly at low pressure, similar to a soaker hose. Perforations may also be slotted, round, square, and/or elongated.

Regardless of the method of placement or system implemented, the target location is contemplated to typically have a target temperature of at least 120° C., at least 180° C., at least 250° C., at least 300° C., at least 350° C., at least 400° C., at least 450° C., or at least 500° C., or at least 600° C. and/or the target location may be below ground at a depth of at least 150 m, at least 300 m, at least 500 m, at least 600 m, at least 700 m, at least 800 m, at least 900 m, at least 1,000 m, at least 1,250 m, at least 1,500 m, at least 1,750 m, at least 2,000 m, at least 2,500 m, at least 3,000 m, at least 4,000 m, at least 5,000 m, at least 10,000 m, or at least 20,000 m.

In certain embodiments, the target location extends in a substantially vertical orientation. The term "substantially" as utilized herein means that the target location extends toward the center of the earth but may be offset from the center by no greater than 15 degrees, no greater than 10 degrees, no greater than 5 degrees, or no greater than 1 degree. It is to be appreciated that the geothermal wellbore may have multiple target locations and thus may have both substantially vertical orientated target locations and target locations extending in orientations that are at least 30 degrees.

The target location, typically being a hot dry rock (e.g., intrusive igneous or metamorphic rock, granitic, basaltic, sedimentary), may or may not include a plurality of fissures that longitudinally extend from the wellbore into the formation. In other embodiments, the target location may also comprise permeable or impermeable rock. Additionally, it is contemplated that the geothermal system may be located in hot wet rock, a "greenfield", a "brownfield", the ocean floor, and/or an oil/gas well. In terms of using oil/gas wells, geothermal energy may be harnessed through the retrofitting of inactive or unproductive wells and co-production on active wells. For example, an old well may be cleaned out then installed with contemplated systems herein. In a further example, an old well may be cleaned out, then deepened prior to installation of systems contemplated herein. Alternatively, an old well may be cleaned out, sidetracked, drilled, and then have the contemplated systems installed. In terms of drilling on the ocean floor, it is contemplated that a geothermal system could be placed at or near seafloor spreading rifts. Drilling on the ocean floor may also be anywhere else where geothermal energy can be extracted, such as major tectonic plate boundaries or rift zones.

As will be readily appreciated, the wellbore may further include man-made and/or naturally occurring fissures, and such fissures may longitudinally extend from the wellbore over a distance of at least 3 m, at least 4 m, at least 5 m, at least 6 m, at least 7 m, at least 8 m, at least 9 m, or at least 10 m, and even more. The fissures can be at least partially filled with a compacted high-thermal k material or thermal reach enhancement (TRE) particles to so form TRE structures. In some embodiments, at least 10%, at least 20%, at least 30%, at least 40%, at least 50%, at least 60%, at least 70%, at least 80%, or at least 90%, and even more, of the volume of each of the fissures contains the compacted high-thermal k material.

When TRE structures are implemented, the high-thermal conductivity material in the TRE structures is contemplated to be thermally coupled with the settled or compacted sheath in the wellbore. Most typically, a first high thermal k material of the proximal mouth portion of the first and/or second TRE structure is flush to the annular space of the wellbore and/or the resulting compacted sheath within the annular space of the wellbore to thereby allow continuous heat transfer from the geological formation, through the high thermal conductivity compacted sheath and heat harvester casing, to the wellbore and the working fluid.

In further contemplated aspects, TRE structures may have a width between 1 mm and 10 mm, between 5 mm and 30 mm, or between 10 and 50 mm, or between 25 and 80 mm, or between 1 mm and 100 mm. In some embodiments, the TRE structures may extend into the formation a longitudinal distance of at least 1 m, at least 50 m, at least 100 m, at least 150 m, or at least 200 m. Still further, and regardless of the specific configuration, it is contemplated that the fissures, and subsequent TRE structures placed within the fissures, in the target location may not only be a single linear break in the rock formation but may also form a complex structure (such as a reticular or dendritic structure). Advantageously, such complex structure will provide for an even larger thermal exchange surface with the remainder of the unfractured rock in the target location. For example, the TRE structures may be formed to have a longitudinal complex multi-fractured geometry with a width of between 10 mm and 50 mm and a length of at least 10 m as measured from the wellbore. However, despite a given width and length of a fissure, the effective length is the amount of the fissure that may be used for the TRE structure. For example, a fissure may be 200 m in total length but only 10 m is the effective length for the TRE structure. Nonetheless, regardless of the specific dimensions it is generally preferable that the TRE structure has a width that decreases from the proximal mouth portion to the distal portion, where the TRE structure extends longitudinally along the wellbore.

As previously mentioned, in this context it should be noted that the compacted high-thermal k material of the TRE structure will typically terminate on a proximal end at the target location of the wellbore such that the compacted high-thermal k material is in uninterrupted (continuous) thermal exchange with a high-thermal conductivity sheath in the wellbore. Thus, the high-thermal k material of the proximal mouth portion of the TRE structure is typically (but not necessarily) flush to the wellbore and/or any annular space within the wellbore. Consequently, a continuous heat transfer path is formed from the target location in the geological formation, via the TRE structure and high-thermal conductivity sheath, to the casing and subsequently to the working fluid within the casing. Furthermore, in at least some embodiments the TRE structure will have a wedge-shaped configuration. Therefore, it should be appreciated that the compacted high-thermal k material of the fissures provides additional thermally conductive surfaces to improve heat extraction from target areas within the formation as opposed to only surfaces of the formation immediately adjacent to the wellbore. Viewed from a different perspective, the compacted high-thermal k material in the fissures will act as a radiator fin or wing that acts as a heat exchange surface to provide significantly improved heat transfer on a per unit length basis of the wellbore, which in turn increases revenue generation for power producing wells. The high thermal k material of the TRE structure will have a thermal conductivity of at least 1.5 W/mK, at least 5 W/mK, or at least 10 W/mK, or at least 25 W/mK, or at least 50 W/mK, or at least 100 W/mK, or at least 250 W/mK, or at least 500 W/mK.

Regardless of the presence of TRE structures, the aforementioned high-thermal conductivity compacted TRE sheath may be formed from the TRE mixture contemplated herein. As briefly discussed above, a TRE mixture comprising a mix of a plurality of suspended TRE particles (materials or mixtures of materials of which at least one component has a thermal conductivity larger than 5 W/mK) and a (typically high apparent viscosity) carrier fluid may be settled and consolidated in an annular space of a wellbore to subsequently form the high-thermal conductivity compacted TRE sheath.

The thermally conductive mixture that is placed, or TRE mixture, is composed of a plurality of thermally conductive materials, or TRE particles, (materials or mixtures of materials of which at least one component has a thermal conductivity larger than 5 W/m-K), a carrying fluid, and optionally surfactants and additives. Contemplated TRE particles that may be used for formation of the TRE sheath, include a plurality of, but are not limited to, graphite, sand, diamond, silver, gold, rhodium, palladium, titanium, carbon fiber, carbon black, Hastelloy, quartz silica, a carbon nanotube, graphene, boron nitride, brass, a brass alloy, chrome nickel steel, carbon steel, stainless steel, a transition metal (e.g., copper, cadmium, cobalt, gold, silver, iridium, iron, molybdenum, nickel, platinum, zinc, and the like), a transition metal alloy (e.g., a copper alloy, a cadmium alloy, a cobalt alloy, a gold alloy, a silver alloy, an iridium alloy, an iron alloy, a molybdenum alloy, a nickel alloy, a platinum alloy, a zinc alloy, an aluminum alloy and the like), a post-transition metal (e.g., lead, tin, and the like), a post-transition metal alloy (e.g., an lead alloy, a tin alloy, and the like), an alkaline earth metal alloy (e.g., a beryllium alloy, a magnesium alloy, and the like), oxides and nitrides of transition metals and post-transition metals, ceramic composites containing silicon and/or aluminum, or combinations thereof. In certain embodiments, the high-thermal k material is selected from the group consisting of graphite powder, exfoliated graphite, flaked graphite, pyrolytic graphite, desulfurized petroleum coke, graphene, fly ash, copper powder, aluminum nitride, alumina, silica, silicon carbide, and combinations thereof. Moreover, the particles may also include carbon-based inorganic, metal, metal oxides, metal nitrides, alloys, and/or hybrid materials, and in some embodiments, the TRE particles comprise at least two chemically distinct materials selected from the group listed above. However, it is preferred that any thermally conductive filler or active material known in the art can be used in the contemplated pumpable suspension. Along the same vein, contemplated TRE particles for use herein may have a thermal conductivity of at least 1.5 W/mK, at least 5 W/mK, at least 10 W/mK, at least 30 W/mK, at least 50 W/mK, at least 100 W/mK, at least 250 W/mK, at least 300 W/mK, or at least 400 W/mK.

Regardless of the specific high thermal conductivity material used for the TRE sheath, the inventive subject matter is largely directed to systems and methods for placing a multi-segmented TRE sheath into a wellbore such that a TRE sheath having thermal conductivity of at least 1.5 W/mK, or at least 5 W/mK, or at least 10 W/mK, or at least 25 W/mK, or at least 50 W/mK, or at least 100 W/mK, or at least 200 W/mK, or at least 300 W/mK, or at least 400 W/mK, is achieved in a target production zone. Thus, a wellbore is also contemplated that includes a resulting vertically or substantially vertically multi-segmented compacted TRE sheath with high thermal conductivity (e.g., at least 1.5 W/mK), wherein at least two segments comprise settled and, subsequently, consolidated TRE particles of the TRE mixture.

Returning to the high apparent viscosity carrier fluid, it may be appreciated that the contemplated carrier fluid may have properties that permit operational control over settling of the plurality of TRE particles. Preferably, the carrier fluid has a composition that allows an additive or triggering event to change physical and/or chemical properties of the mixture in situ to thereby reduce viscosity and thereby allow the particles to settle via gravity at a target location to so form a settled particle sheath within an annular space of a geothermal wellbore at a target location. Consequently, it is contemplated that the TRE particles have a composition that allows consolidation of the settled particle sheath to form a high-thermal conductivity compacted sheath within the annular space of the wellbore.

In this context, it is contemplated that a carrier fluid will typically have a dynamic viscosity at a temperature of 20° C. and before viscosity breaking or a trigger event of between 10 cP and 10,000 cP (e.g., between 500 and 1,500, or between 1,500 and 3,000, or between 3,000 and 6,000, or between 6,000 and 10,000 cP), and in some cases even higher (e.g., between 10,000 and 25,000 cP). It is in this state that the carrier fluid is combined with the thermally conductive particles to so form a pumpable TRE mixture for deployment to the target area in the geothermic well. As will be readily appreciated, the magnitude of the drop in apparent viscosity due to the chemical reaction or triggering event (visbreaking) will depend at least in part on the specific materials and conditions used. For example, various chemical reactions or triggering events may result in a reduction of viscosity within at least 1 hour, at least 12 hours, at least 24 hours, at least 36 hours, at least 48 hours, or at least 72 hours. The amount of time necessary for visbreaking may depend on the type of chemical reaction or triggering event and may vary case by case. However, it is generally contemplated that the dynamic viscosity of the carrier fluid will be at least one order of magnitude lower, or at least two orders of magnitude lower. Thus, suitable dynamic viscosities after the chemical reaction or triggering event will typically be between 1 and 1,000 cP (e.g., between 5 and 15, or between 15 and 100, or between 100 and 500, or between 500 and 1,000 cP), and in some cases even higher.

As used herein, "breaking" refers to a process in which the viscosity of a high viscosity fluid is reduced to allow for faster settling of thermally conductive materials that are suspended in the high apparent viscosity carrier fluid. As mentioned above, viscosity may be reduced, and the high apparent viscosity carrier fluid thereby broken, by a triggering event such as a change in chemical composition, pH, temperature, and/or by the passage of time.

In some embodiments, chemical agents ("breakers") may be utilized to reduce the molecular weight of a guar polymer by fragmenting the polymer chain. As the polymer chain is broken down, the fluid's viscosity is reduced. Where desired, the molecular weight may be reduced to near water-thin viscosity. For example, chemical breakers or breaker additives may be used to reduce viscosity of natural gelling polymers. In the present context, guar and derivatized guar polymer breakers are generally grouped into three classes: oxidizers, enzymes, and acids. All three classes of materials reduce the viscosity of the gel by breaking the polymer chain. Here, the breakers operate by cleaving the backbone of the polymer either by hydrolysis of acetal group, cleavage of glycosidic bonds, oxidative/reductive cleavage, free radical breakage, or a combination of these processes. Nonetheless, no particular mechanism is implied by the term. Rather, the term denotes a resulting consequence on the high viscosity fluid that is broken, i.e., a thinning or reduction in viscosity to thereby allow settling of the solid particles that were previously suspended.

Preferably the carrying (or carrier) fluid comprises water (e.g., water only or an aqueous solvent system), or fluid carbon dioxide. In some embodiments, the carrier fluid of the TRE mixture has a composition that allows an additive or triggering event to change physical and/or chemical properties of the mixture in situ to thereby reduce apparent viscosity and thereby allow the thermally conductive material to settle via gravity at the target location to so form a settled particle sheath with a thermal conductivity of at least 1 W/mK, or at least 3 W/mK, or at least 5 W/mK, or at least 10 W/mK, or at least 20 W/mK, or at least 50 W/mK, or at least 100 W/mK, or at least 200 W/mK, or at least 400 W/mK. Thus, a TRE sheath may have, upon settling, a thermal conductivity of between 3-5 W/mK, or between 5-10 W/mK, or between 10-25 W/mK, or between 25-50 W/mK, or between 50-75 W/mK, or between 75-100 W/mK, and even higher.

Suitable additives for the TRE mixtures contemplated herein include an oxidizer, a biobased enzyme, a bacterium, or a pH modifier, that allows reducing the viscosity with a shear force or temperature change. Most typically the additive comprises at least 0.001 wt %, or at least 0.001 wt %, or at least 0.01 wt %, or at least 0.1 wt %, or at least 1 wt %, or at least 5 wt %, or at least 10 wt % of the total suspension wt %. In some embodiments, the additive modifies the temperature stability of the pumpable suspension. In other embodiments, the pumpable suspension optionally further comprises a second additive that promotes the association of the thermally conductive materials to a viscosity agent to thereby improve mixing and dispersion of the thermally conductive materials within the carrier fluid. Additionally, or alternatively, a second additive that breaks a polymer backbone or a polymer-polymer crosslink, optionally in response to the triggering event can also be added. Where desired, the pumpable suspension optionally further comprises a second additive that absorbs thermal energy to extend the usable temperature range for a given polymer by at least 1° C., or at least 5° C., or at least 10° C., or at least 20° C., or at least 35° C., or at least 50° C.

Furthermore, additives are most typically selected from a cross-linker additive, a dispersant additive, a breaker additive, or a stabilizer additive. For example, the cross-linker additive may be boron, titanium, or zirconium based. The dispersant additive may be a surfactant, a polymer, a salt, or a pH modifier. Where desired, the breaker additive may be a pH modifier, an oxidizer, an enzyme, or a bacterium. Preferably, the stabilizer additive is an oxidizer. Nonetheless, the composition comprises at least two distinct additives in various embodiments.

Consequently, the carrier fluid suspends the plurality of TRE particles until the viscosity of the carrier fluid is reduced by the triggering event in situ such as a change in chemical reactivity, or pH, or temperature, or time. In response to the reduction in viscosity, the thermally conductive material may begin to settle via gravity.

It is generally contemplated that that the thermally conductive material of the TRE mixture settles to so form a sheath segment having a length of at least 1 m, or at least 3 m, or at least 5 m, or at least 10 m, or at least 20 m, or at least 50 m, or at least 100 m, or at least 250 m, or at least 500 m, or even higher, within a time frame of at least 10 hours, at least 24 hours, at least 48 hours, or at least 72 hours. Consequently, the steps of the methods contemplated herein may be performed until the TRE sheath covers at least 10%, at least 25%, at least 50%, at least 75%, or at least 100% of the vertical height of the wellbore.

To further improve heat transfer, the settled thermally conductive material may then be consolidated to form a compacted TRE sheath with a final porosity of between 0%-15%, or between 10%-25%, or between 20%-35%, or between 30%-45%, or between 45%-55%, or between 50%-60%, or between 60% to 70%. For example, this may be done through hydraulic consolidation or chemical consolidation. Hydraulic consolidation may be used by removing pore fluid through hydraulic flow from the pores. In various embodiments, chemical consolidation may be performed by chemical reactions that reduce the amount of carrier fluid. After applying some form of consolidation, to the settled TRE particles, the resulting compacted TRE sheath is contemplated to have a permeability of equal or less than 10 Darcy. For example, the compacted TRE sheath may have a permeability of up to 0.01 Darcy, up to 1 Darcy, up to 2 Darcy, or up to 5 Darcy, or up to 10 Darcy.

In addition, the compacted TRE sheath is contemplated to be configured (or have a composition) in such a way to remain flexible for movement with subsurface changes. For example, if over long periods of time the rock begins to shift and/or change shape, the TRE sheath will be able to retain its function and continue to improve geothermal energy production.

Although it is generally contemplated that the so formed TRE sheath will be in a substantially vertical configuration, the TRE sheath described herein may also be thermally coupled to an extended TRE structure composed of TRE fractures, a TRE network, or TRE microstructure. This extended TRE structure may be naturally occurring, with TRE permeating naturally occurring rock microstructure or permeability or porosity around the geothermal well. The extended TRE structure may also be manmade, for example with lateral or transverse fractures created by hydraulic fracturing of the rock surrounding the geothermal well. When there are TRE structures in the surrounding geological formation, the multi-segmented TRE sheath is preferably fluidly coupled to a proximal mouth portion of the TRE structure that extends from the wellbore distally into the geological formation at the target location.

Nonetheless, when looking at the sheath placement workflow in general, the annular space of a geothermal well will be filled with a special TRE mixture, in multi-stages, allowing each stage to settle and reach a target level of solids compaction, at which a thermal conductivity >5 W/mK is achieved. For example, the resulting compacted TRE sheath may have a thermal conductivity of at least 1.5 W/mK, at least 5 W/mK, or at least 10 W/mK, or at least 25 W/mK, or at least 50 W/mK, or at least 100 W/mK, or at least 250 W/mK, or at least 500 W/mK.

As discussed above, the steps include at least one of pumping, at least one of staged placement, and (typically for each staged placement) at least one of compaction/drainage. Each step, or all the steps, may be repeated as necessary to cover at least 5%, at least 10%, at least 20%, at least 40%, or at least 50% of the casing in a target location. In some embodiments, at least 10%, at least 20%, at least 30%, at least 40%, at least 50%, at least 60%, at least 70%, at least 80%, or at least 90%, and even more, of the volume of the wellbore contains the compacted high-thermal k material. In some embodiments, the TRE mixture may have an increased concentration of thermally conductive material such that placement of the TRE mixture (and consequently the TRE sheath) can be done in one stage without the need for settling. In such embodiments, it is contemplated that the thermally conductive material may be present in the TRE mixture in an amount of at least 30 wt %, at least 40 wt %, at least 50 wt %, at least 60 wt %, at least 70 wt %, at least 80 wt %, or at least 90 wt % of the total weight of the TRE mixture.

In further embodiments, it is generally contemplated that each segment of the TRE sheath may have a vertical length of at least 10 m, at least 50 m, at least 100 m, at least 500 m, at least 1,000 m, at least 1,500 m, at least 2,500 m, at least 4,000 m, or at least 5,000 m. Therefore, a multi-stage TRE sheath may have a vertical length of between 20 m and 100 m, or between 50 m and 200 m, or between 200 m and 500 m, or between 500 m and 1,500 m, or between 1,000 m and 2,000 m, or between 2,000 and 3,000 m, or between 2,500 m and 4,000 m, or between 3,000 m and 4,000 m, or between 3,500 m and 5,000 m, and even more.

Once the annular space is filled, a return tubing is typically run into the casing and hung from the surface. The well will then be operated by circulating working fluid down the annular space between the outer casing and the outer surface of the internal return tube, increasing in temperature as it circulates down the well. The working fluid will then circulate up the return tube to the surface, where the heat will be extracted from the working fluid using a surface heat exchanger. Regardless of the configuration, placement, and temperatures, transfer from the hot rock formation to a working fluid in a closed-loop circuit of a wellbore will rely on thermal energy transfer through a medium that thermally couples the formation to the casing of the closed-loop circuit. Most typically, placement of such medium is in the form of a sheath. Unfortunately, due to the length of the sheath, depth, and temperature of the target location, conventional placement of known compositions is less than trivial. However, as will be readily appreciated the workflows presented herein will avoid or even entirely eliminate numerous difficulties associated with conventional compositions and methods. As will also be readily appreciated, contemplated methods can use a variety of processes at each step of pumping, staged placement, and compaction/drainage. The various approaches may also be combined such that one stage or step may utilize one approach, then the next stage or step may utilize another approach. Finally, it should be particularly appreciated that the installation of multiple TRE sheath segments using the methods presented herein will dramatically reduce the time to prepare a TRE sheath of any given length as the settling time can be kept reasonably low (since the settling process exponentially increases with length).

EXAMPLES

Pumping

One exemplary method of pumping includes top job placement, as is shown in FIG. 1. In a top job placement, thermally conductive material is placed subsurface in a top job manner to so exceed 5 W/mK in target production zone. A typical method will include the following steps:

1. Drilling a wellbore to a target location 100.
2. Inserting run-in-hole casing 105.
3. Locating a tubing, that may or may not be coiled, with shoe 50 to 100 meters inside the annulus 110.

4. Pumping TRE mixture as a top job until reaching the top of the annulus 120-150. Suitable slurries are described, for example, in U.S. 63/550,937, filed Feb. 7, 2024, incorporated by reference herein.

5. Waiting for the pumped TRE solids to settle down below the tubing shoe 170.

6. Perform steps 4 and 5 until the pumped TRE solids reach the bottom of the annulus 160.

7. Wait for TRE solids to compact by settling 175. Target outcome is a placed TRE solids system (which will likely still retain some fluid) in with an aggregate thermal conductivity >5 W/m-K.

8. Perform steps 3 to 7 (e.g., at least two stages) until the settled TRE solids reach to top of the annulus 120-150.

Figure 2:
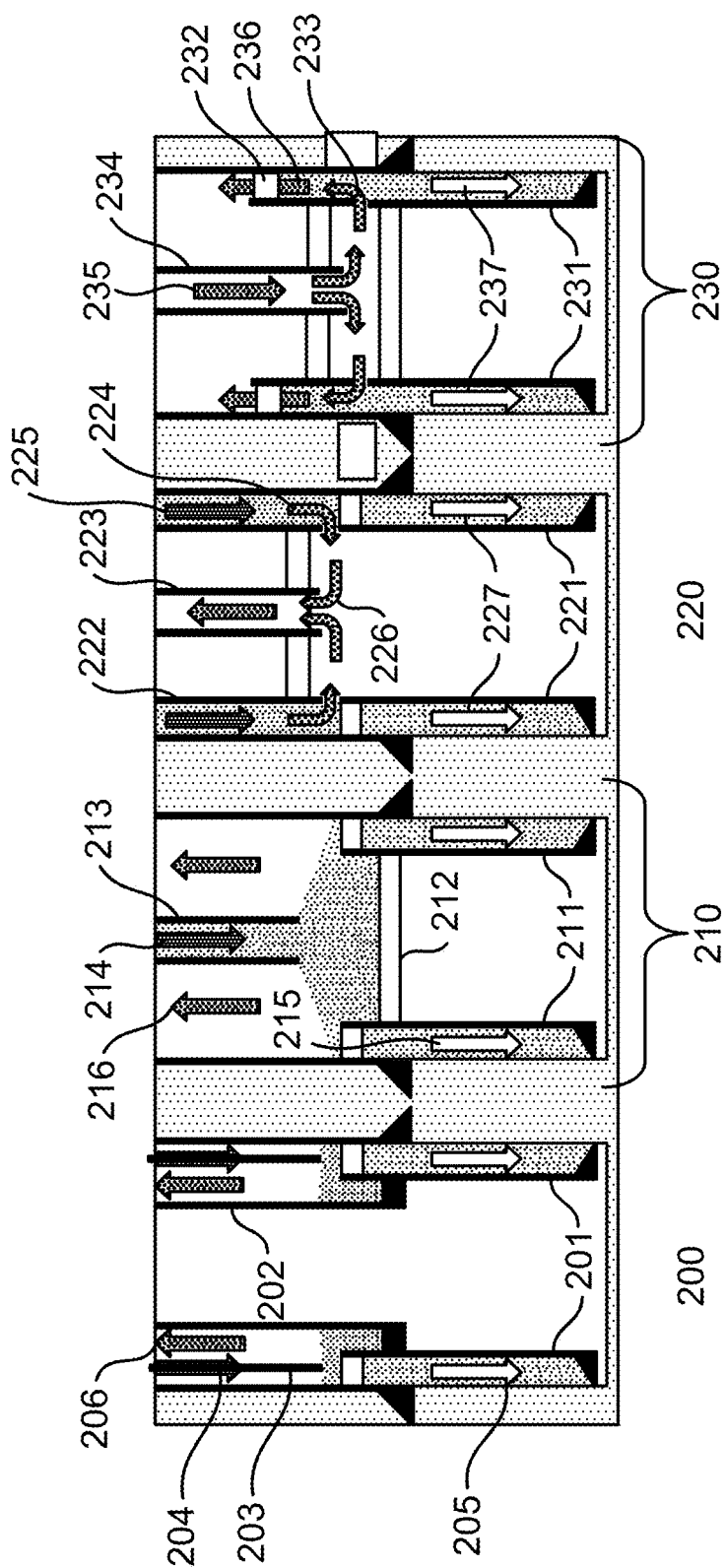
FIG. 2 is an exemplary schematic illustrating four different methods of pumping from left to right: tubing in the annulus, settling through liner hanger, reverse with tie-back, settling with slotted or perforated joint.

As will be appreciated, such solution will be engineered with consideration of the flow rate and standby between stages. Operationally, various approaches can be taken, as shown also in FIG. 2. For example:

1. Tubing in the annulus 200:
   Run a 9⅝" liner 201 in the hole.
   Run an 8⅝" tie-back 202 in the hole and insert it on the liner 201 polished bore receptacle (PBR).
   Run a 1.5" tubing 203 in the annular space between tie-back and wellbore.
   Pump a TRE fluid stage 204, followed by the volume of water necessary to empty the tubing, through the tubing 203; Stop pumping and wait for the TRE solids to settle 205.
   Perform new stages until the top settled TRE has reached the required depth, pull tubing and then tie-back out of the hole 206.

2. Settling through liner hanger 210:
   Run a 9⅝" liner in the hole 211.
   Place a packer 20 feet inside the liner 212.
   Run a drill pipe 213 in the hole with bottom above the liner top.
   Pump TRE fluid stage 214, followed by the volume of water necessary to empty the drill pipe, through the drill pipe; Stop pumping and wait for the TRE solids to settle 215.
   Perform new stages until the top settled TRE has reached the required depth, pull drill pipe out of the hole and remove liner packer in direction 216.

3. Reverse with tie-back 220:
   Run a 9⅝" liner in the hole 221.
   Run a tie-back 222 with drill pipe 223 in the hole, do not insert the tie-back shoe in the liner PBR and leave a gap 10 feet length 224.
   Pump TRE fluid stage 225, followed by the volume of water necessary to empty the drill pipe, in the annular space between tie-back and wellbore and recover the water, which is flowing between the tie-back shoe and liner top and then in the drill pipe up to surface 226; Stop pumping and wait for the TRE solids to settle 227.
   Perform new stages until the top settled TRE has reached the required depth, pull drill pipe out of the hole with the tie-back.

4. Settling with slotted or perforated joint 230:
   Run a 9⅝" liner in the hole 231 with a slotted or perforated joint 100 meters below hanger above intermediate casing shoe.
   Place a packer 232 in the liner 20 feet below the slotted 233 or perforated joint.
   Place a packer in the liner 20 feet above the slotted or perforated joint.
   Run a drill pipe 234 in the hole with bottom between the two packers.
   Pump TRE fluid stage 235, followed by the volume of water necessary to empty the drill pipe, through the drill pipe, it flows through the slots 233 and then upwards in the annulus 236; Wait for the TRE solids to settle 237.

New stages can then be performed until the TRE mixture reaches the intermediate casing shoe, at which time the drill pipe is pulled out of the hole and the liner packers are removed.

Pumping details for top job: The top-job TRE placement method is used to help ensure the TRE mixture completely fills the well's annulus. There are several reasons why the mixture may not complete fill the annular space between the casing and the wellbore during TRE pumping operations. The most common are TRE bridging between the casing and the wellbore wall, loss of fluid returns during pumping operations and excessive, non-accounted for, wellbore enlargements. The Top-Job method involves inserting small tubing directly into the casing-well bore annulus after the casing has been run into the hole, pumping an annular wash fluid through the small tubing to clean the annulus residual fluids and then pumping the TRE mixture down the small tubing and fill the annulus. After the annulus has been completed filled with the TRE mixture the small tubing is removed.

Figure 3:
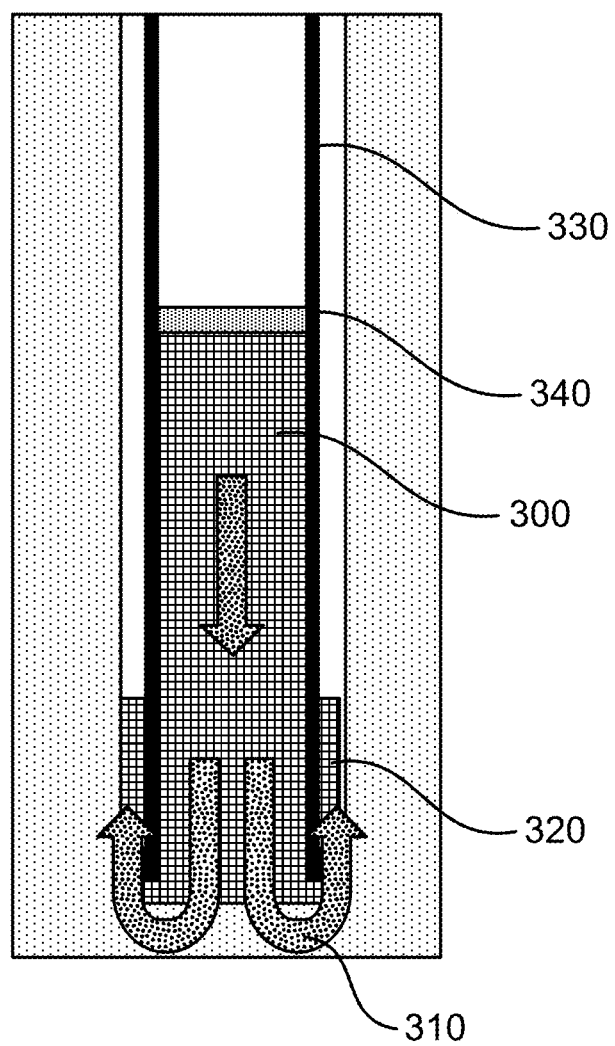
FIG. 3 is an exemplary schematic illustrating the method of staged placement comprising forward circulation process.

In further example, a forward circulation process, as shown in FIG. 3 involves mixing and pumping the TRE mixture into the casing 330. The TRE mixture 300 is pumped out of the bottom of the casing 310 into the well's casing wellbore annulus 320. The conventional forward circulation method typically utilizes two casing plugs (bottom and top). The bottom plug is pumped into the casing directly ahead of the TRE mixture and provides a mechanical separation between the wellbore drilling fluid and the TRE mixture. The bottom plug also wipes the internal walls of casing removing any fluid contaminants, which may have accumulated over time and is designed with a differential pressure rupture device that opens when an internal casing pressure differential of between 350 and 750 psi is applied, therefor allowing the TRE mixture to exit the casing and enter the casing-wellbore annulus. Once all the TRE mixture has been pumped into the casing a top plug 340 (solid) is pumped into the casing, and drilling fluid is pumped to force the TRE mixture down the casing and into the well's annulus. The top plug provides a mechanical separation between the TRE mixture and drilling mud and provides a positive indication that all TRE mixture is pumped out of the casing. Spacers and washes can be pumped ahead of the TRE mixture to provide a separation between the TRE mixture and the drilling mud to be displaced and to help displace the drilling mud.

In some embodiments, the TRE mixture may also be placed as a conventional cement job. For example, the TRE mixture may be pumped as a lead and a cement mixture may be used as a tail to seal the annulus at the casing shoe.

An additional example of a pumping method is the reverse circulation process, thermally conductive material is pumped down the annular space between the casing and the wellbore in the form of a mixture, which then displaces the drilling fluid back up through the casing. This process can be used to reduce the TRE mixture placement time and temperature, thereby requiring a lower chemical loading in the TRE mixture. The reduction in TRE placement time can also reduce the risk of premature polymer breakdown due to time it is exposed at well temperatures. Finally, it also allows reducing the equivalent circulating density, hence minimizing fluid losses. Reverse circulation requires special casing float equipment, modified well head assemblies and extensive engineering.

However, the reverse circulation process is a tried and proven mixture placement method, that can be done with proven engineering tools and design simulators so there is no need to develop new pieces of equipment. Use of this process results in a reduction in TRE placement time and a reduction of risk of loss of circulation.

In further example, in a casing movement process, thermally conductive material is preferred for enhancing the mixture placement into the wellbore annulus. As the casing is moved, it distributes the TRE mixture evenly covering the entire circumference of the wellbore and filling the annulus. Casing rotation is more efficient than casing reciprocation since it helps to move the mixture from the wide annuli into the narrow one when the casing standoff is low.

The casing movement process is a tried and proven mixture placement method, that utilizes proven engineering tools and design simulators.

In further example, in an external tubing process, tubing is installed on the external side of the casing. Most typically, the casing and external tubing are run into the well to the desired depth. The TRE mixture is pumped through the external tubing and flows upwards in the annular space between the casing and the wellbore.

The external tubing process enhances TRE sheath compaction and does not require development of new pieces of equipment. In addition, the external tubing process may also be utilized as a staging method.

Staged Placement

Figure 4:
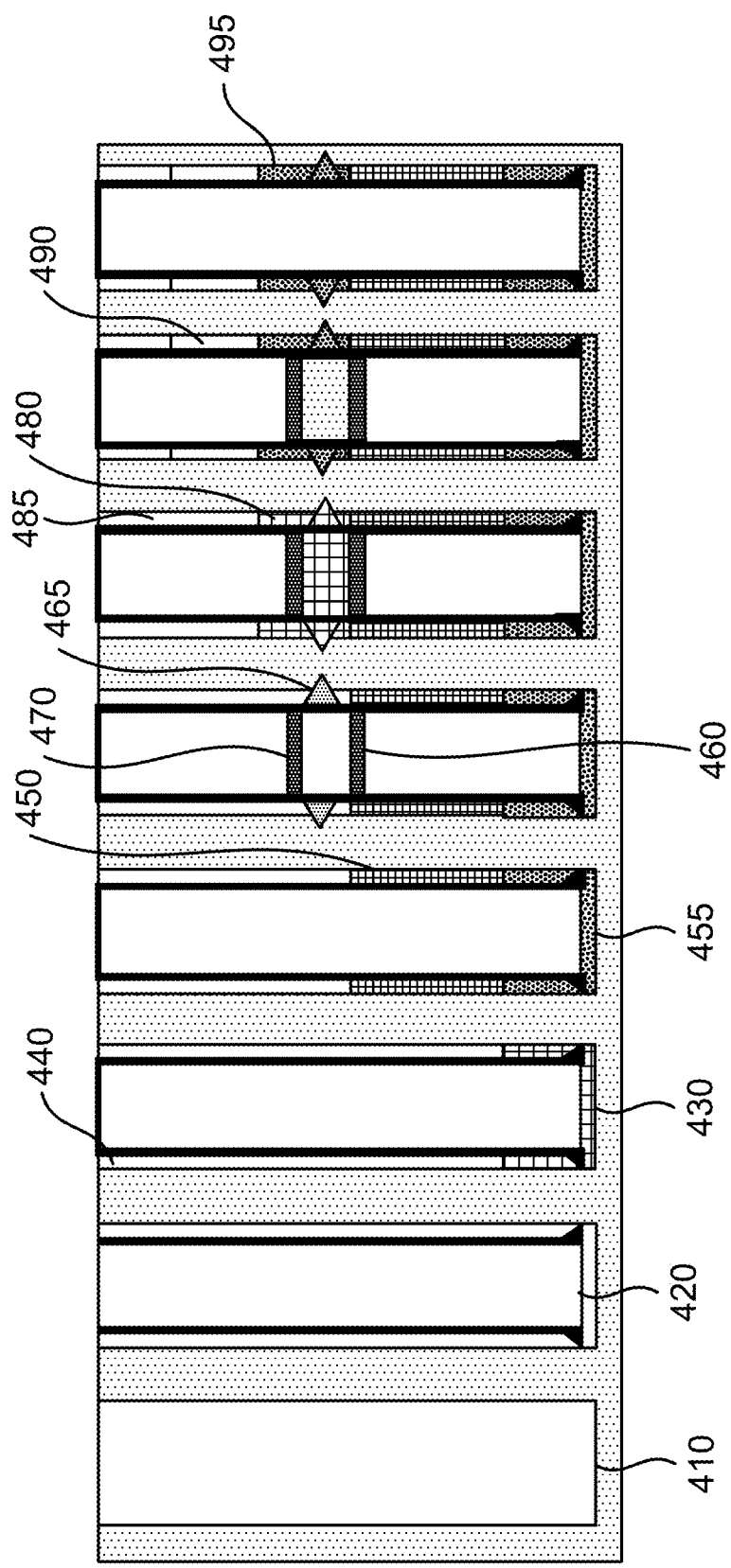
FIG. 4 is an exemplary schematic illustrating staging details for perf & plug placement.

An exemplary method of staged placing includes a perf & plug placement, as shown in FIG. 4, where thermally conductive material is placed in a perf and plug method (not to be confused with a plug and perf method) subsurface and exceed 5 W/mK in target production zone. A typical method will include the following steps:

1. Drill a wellbore 410, install a run-in-hole casing 420, then use the forward circulation pumping method to place a first stage of TRE mixture with the following steps:
    a. Circulate cold water to cool down the well.
    b. Pump TRE lead mixture.
    c. Pump cement tail mixture 430 which, when hydrated, will prevent TRE mixture flow back.
    d. Pump TRE mixture 440.
2. Wait for TRE solids to compact by settling 450 as well as set cement 455. Target outcome is a placed TRE solids system (which will likely still retain some fluid) in with an aggregate thermal conductivity >5 W/m-K
3. Locate the top of settled TRE.
4. Place an optional bottom bridge plug 460 at the depth of the top of the settled TRE.
5. Perforate the casing 465 over 20 feet, starting 5 feet above the bottom bridge plug (note: the distances are for illustration only and can change based on various factors, including the target size of the stage).
6. Place an optional upper bridge plug 470 10 feet above the top of the perforated zone (note: the distances are for illustration only and can change based on various factors, including the target size of the stage).
7. Use the forward circulation pumping method to place a second stage of TRE mixture with the following steps:
    a. Circulate cold water to cool down the well.
    b. Pump TRE lead mixture.
    c. Pump cement tail mixture 480 which, when hydrated, will prevent TRE mixture flow back.
    d. Pump TRE mixture 485.
8. Wait for TRE solids to compact by settling 490.
9. Locate the top of settled TRE.
10. If bridge plugs used, drill bridge plugs 495.
11. Perform steps 4 to 10 until the settled TRE solids reach to top of the annulus.

Figure 5:
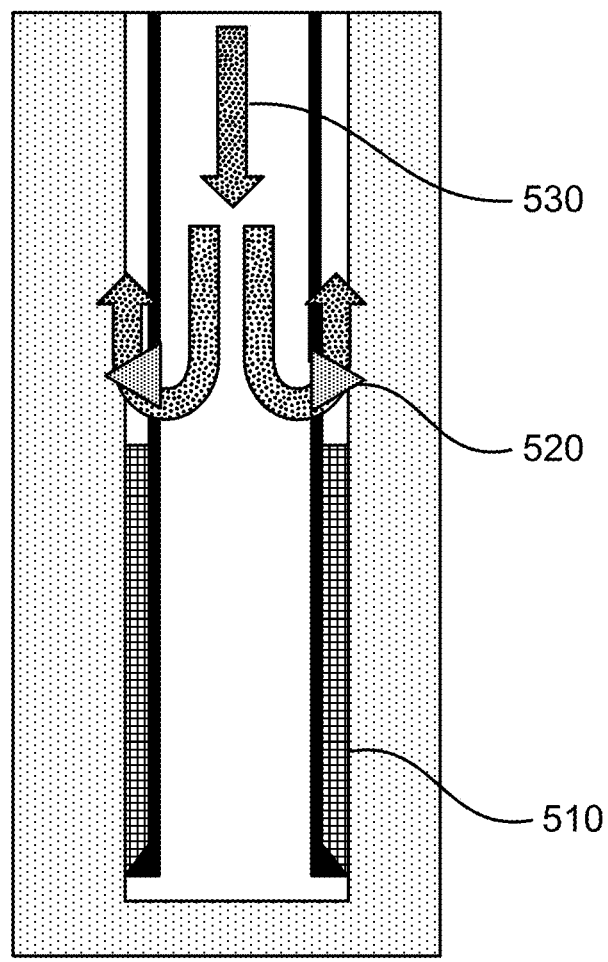
FIG. 5 is an exemplary schematic generally illustrating perf & plug placement.

Staging details for perf and plug as shown in FIG. 5: A typical Perf-and-Plug method will include the steps of (1) Pumping the TRE mixture in the annulus (stage 1). (2) Waiting for TRE compaction 510. (3) Measuring the top of compacted TRE. (4) Perforating casing above the measured compacted TRE top 520. (5) Pumping the TRE mixture using the created perforations 530 (stage 2). (6) Reproducing steps 2-4. (7) Reproducing steps 5-6 as many times as required (stages 3 and following). (8) Plug all perforation to recover the integrity of the casing. Using cement as a tail mixture to plug the perforation will lead to the presence of restriction in the annulus and there is a risk that a water pocket is created if additional compaction takes place. This will require to run a drainage tubing into the hole. Other solutions could be to replace the tail cement mixture by patches, but such patches must remain efficient for very long periods of time at very high temperatures.

Figure 6:
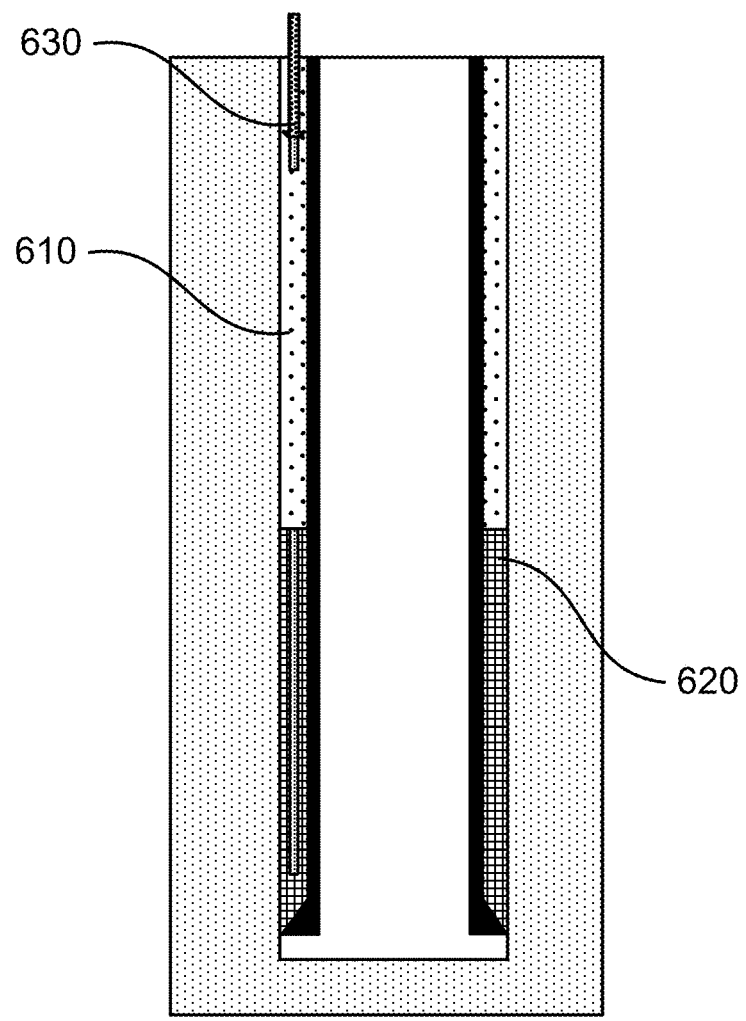
FIG. 6 is an exemplary schematic illustrating top job placement.

Staging details for top job placement as shown in FIG. 6: A typical sedimentation staging method will include the steps of (1) Pumping a batch of TRE solid particles in the hole 610. (2) Having these solid particles settle in the annulus 620. (3) Pumping another batch of TRE solid particles in the hole as soon as the previous batch has sufficiently settled 630. (4) Repeating steps 2-3 as long as necessary. This method results in a nearly continuously filling of the annulus where the particles see only an increase of temperature, which eases the TRE fluid design.

Another example of staged placement includes the differential valve method. Differential valve (DV) tools are used to cement multiple well sections behind the same casing string, or to cement a critical long section in multi-stage. Stage tools are installed at a specific point in the casing string as casing is being run into the hole. The first (or bottom) cement stage is pumped through the tool to the end of the casing and up the annulus to the calculated-fill volume (height) using the forward circulating cementing method. When this stage is completed, first stage shut off plug is released into the casing, pumped down and lands on the casing float collar. The first stage shut off plug provides a mechanical seal to prevent additional fluids from being pumped out of the bottom of the casing. A free-falling plug or pump down dart is used to hydraulically set the stage tool and open the side ports, allowing the second cement stage (top stage) to be displaced above the tool. A closing plug is used to hydraulically close the sliding sleeve over the side ports at the end of the second stage and serves as a check valve to keep the cement from U-tubing above and back through the tool. Similar approaches can be found with multiple stage fracturing and sand control tools.

The DV method utilizes proven engineering tools and design simulators, reduces risk of loss circulation due to well conditions, ensures cement placement over critical areas, and does not require development of new pieces of equipment.

In yet another example, the inventor contemplates a liner/tie-back method wherein liners and casing strings are sections of pipe that are run into the wellbore and cemented in place. Liners are shorter than casing strings and do not extend to the surface. They are hung from the previous casing string by a liner hanger, which is a device that attaches the liner to the casing and seals the annulus between them. There are many versions of liner hanger tools, mechanical set, hydraulic set, with and without liner lap seal assemblies, which have been used and perfected for years. Liners can be converted into a full string of casing with the use a polished bore receptacle (PBR) in which is installed a tie-back, which is basically a casing string, which lower end is equipped with a special tool that fits in the PBR. A typical method would consist of the following steps:
1. Placing a liner/tie-back, in the well with the liner hanger located below or above the previous casing shoe.
2. Pumping the TRE mixture in the annular space between the tubular and the wellbore (stage 1).
3. Waiting for TRE compaction and measuring the top of compacted TRE.
4. Running a new linear string with PBR in the hole without fitting it into the previous liner BPR.
5. Pumping the TRE mixture through the space between the new liner shoe and the previous liner PBR, into the annular space between the tubular and the wellbore (stage 2).
6. Running the new liner shoe into the previous liner PBR.
7. Waiting for TRE compaction.
8. Reproducing steps 4-8 (stages 3 and following).
9. Optionally removing the tie-back.

The liner/tie back method reduces risk of loss circulation due to well conditions, ensures cement placement over critical areas, and utilizes liner hanger technology that is validated in a cased hole.

In further example, an external tubing staging process may also be used for staged placement. In this process, the TRE mixture is pumped through the external tubing and flows upwards in the annular space between the casing and the wellbore. When TRE compaction has been reached, a logging tool is used to determine the top of the settled TRE, and the external tubing is cut above this depth.

Figure 7:
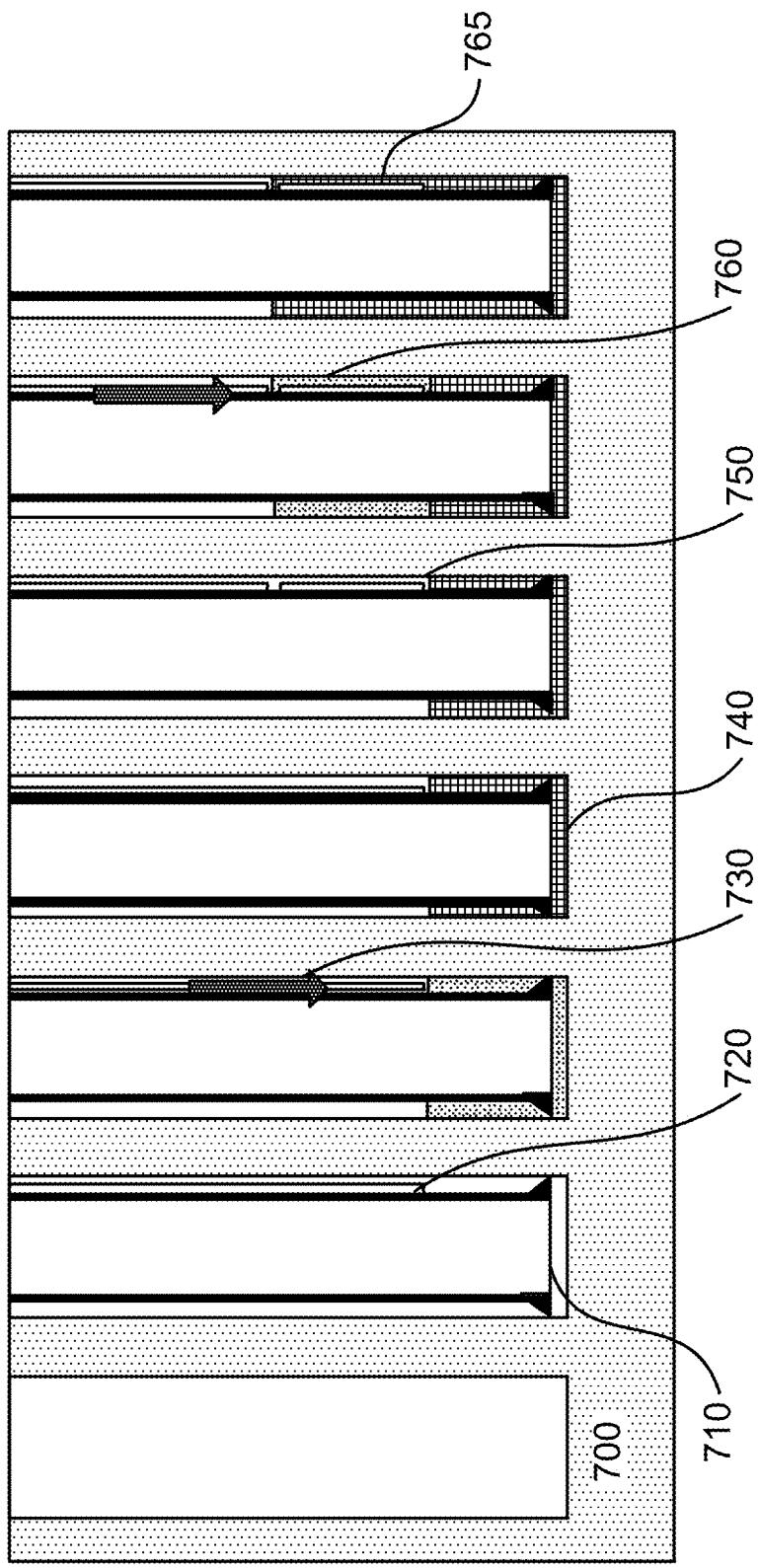
FIG. 7 is an exemplary schematic illustrating external sedimentation placement.

Yet another exemplary method of staged placement is the sedimentation process. The sedimentation process or "external sedimentation placement method" comprises the steps of pumping batches of TRE solid particles in the borehole, one after another, after having waited for the particles to settle in the annulus. This process differs from the external tubing staging process in that the pumping rate is low to obtain a continuous process such that the TRE particles see only an increase of temperature, thereby easing the TRE mixture design. A typical method would comprise the following steps, as also shown in FIG.7:
1. Drill a wellbore 700, install a run-in-hole casing 710, then use the external tubing 720 to place a first stage of TRE mixture:
   a. Pump a TRE mixture batch 730 and 760;
   b. Wait for the pumped TRE solids to settle down below the external tubing shoe 740 and 765;
   c. Perform steps a-b until the pumping parameters have changed, showing that the top of the TRE has reached to tubing shoe;
2. Cut the external tubing above the settled TRE solids 750;
3. Perform steps 1 to 2 until the settled TRE solids reach to the top of the annulus.

Compaction/Drainage

An exemplary way to complete compaction/drainage is the vaporization method. Once the TRE mixture has been placed the annular space between the casing and the wellbore, the mixture will rapidly gain heat from the reservoir rock and the mixture's internal pressure will be equal to the well's hydrostatic pressure at a given vertical depth. The well's hydrostatic pressure can be artificially reduced to a value that allows the free water in the mixture to experience a "flash steam" point which will help in dewatering the TRE mixture.

The vaporization method increases control related to TRE installation, reduces rig time dewatering the TRE mixture, results in a high percentage of water being removed from the mixture, and there is no need to develop new pieces of equipment.

In further example of compaction/drainage, a stimulation-based method may be utilized. The oil and gas industry has many types of stimulations tools, which could enable the selective placement of a mixture in a well. These tools can be categorized into two main functions which are well fracturing and sand control:

Well fracturing casing tools are typically designed with sliding sleeves, which can be selectively opened and/or closed using either a mechanical plug or internal pressure. These tools allow for the mixture to exit the casing at a desired depth through ports and are used to ensure that the frac fluid is evenly distributed throughout the desired depths of the well. Their use for TRE compaction/drainage would consist of placing a series of fracturing tools in the production casing string, run the casing into the hole, place the mixture into the annular space between the casing and the wellbores, use a ball or plug to open/close the ports to allow the base fluid to escape the annulus.

Typically, sand control (SC) operations require that the formation and casing annulus is packed with sand which acts as a particle filter to prevent the flow of formation sand into the production casing. Sand control tools allow for the mixture to be pumped into the well via a tubing, when the mixture reaches desired depth, a diverter tool enables the mixture to exit the tubing and enter the casing-wellbore annulus where the mixture is pumped down annulus to a desired depth in the well. Then the base fluid can escape the annulus through the pores of the sand control tool.

A stimulation-based method does not require development of new pieces of equipment. In addition, higher percentages of water may be removed from the mixture, there is reduced rig time dewatering the TRE mixture using proven stimulation tools, and TRE sheath compaction may be enhanced.

In another example, the external tubing draining method may be used. The external tubing draining method refers to installing perforated tubing on the external side of the casing. The casing and external tubing are run into the well to the desired depth. The external tubing is used to drain the water from the TRE mixture and bring it to surface. In some embodiments, the external tubing process may be localized only along the casing joint, without covering the casing connection.

The external tubing draining method also does not require development of new pieces of equipment, a higher percentage of water may be removed from the TRE mixture, there is reduced rig time dewatering the TRE mixture, and TRE sheath compaction may be enhanced.

In further example of compaction/drainage methods, the grooved casing method may also be utilized. Here, a Tubular can be designed and manufactured to assist in TRE dewatering and removal of free water from the TRE annulus by adding axial grooves on its outer interface. As will be readily appreciated, using this method, a high percentage of water may be removed from the mixture, rig time dewatering the TRE mixture may be reduced, and TRE sheath compaction may be enhanced.

Yet another exemplary method of compaction/drainage is the casing vibration method. Experimental data has shown that vibrations could help TRE solids settling and compaction. It should also help better placing and compacting the TRE close to obstructions such as centralizers and casing connections. Mechanical or sonic tools are contemplated to be used for this. Similar to above, this method may also enhance TRE sheath compaction, reduce rig time dewatering the TRE mixture, and/or allow for a high percentage of water to be removed from the TRE mixture.

Aspects

The present disclosure will be better understood upon reading the following numbered aspects which should not be confused with the claims. In some instances, each of the aspects described below can be combined with other aspects, including combined with other aspects described elsewhere in the disclosure or other aspects from the examples below, without departing from the spirit of the disclosure.

1. A method of placing a TRE sheath into a wellbore in stages, comprising: pumping a TRE mixture into an annular space of the wellbore; wherein the TRE mixture comprises a plurality of thermal reach enhancement (TRE) particles and a carrier fluid that suspends the particles; settling the TRE particles in the annular space of the wellbore; optionally removing the carrier fluid from the TRE mixture; consolidating the TRE particles to thereby form a thermally conductive and compacted TRE sheath in the wellbore; and wherein the step of pumping the TRE mixture, and/or the step of settling the TRE mixture, and/or the step of removing the carrier fluid, and/or the step of consolidating the TRE particles is repeated in at least two stages.

2. The method of aspect 1, wherein pumping the TRE mixture uses a forward circulation process, a reverse circulation process, a casing movement process, a top-job process, or an external tubing process.

3. The method of aspects 1-2, wherein the plurality of TRE particles is selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and optionally wherein the thermally conductive material comprises at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy.

4. The method of aspects 1-3, wherein the carrier fluid comprises water or fluid carbon dioxide.

5. The method of aspects 1-4 wherein the carrier fluid is a high apparent viscosity fluid with a composition that allows an additive or triggering event to change physical and/or chemical properties of the mixture in situ to thereby reduce viscosity and allow the thermally conductive material to settle via gravity.

6. The method of aspects 1-5, wherein the method of placing a TRE sheath in stages uses a differential valve process, a perf-and-plug process, a liner/tie-back process, a sedimentation process, or an external tubing process, and/or wherein a cement mixture follows placement of the TRE mixture as a tail to seal the annular space.

7. The method of aspects 1-6, wherein removing the carrier fluid uses an external tubing process, a stimulation-based process, a vaporization process, or a grooved casing process, or a casing vibration process.

8. The wellbore of aspects 1-7, wherein consolidating the TRE particles comprises hydraulic or chemical consolidation.

9. The wellbore of aspects 1-8, wherein the TRE sheath is placed at a depth of between 150 m and 20,000 m below the surface.

10. The wellbore of aspects 1-9 wherein the TRE sheath is placed at a location with a geostatic temperature of between 120° C. and 600° C.

11. The wellbore of aspects 1-10 wherein the TRE sheath has a vertical length of at between 10 m and 10,000 m.

12. The wellbore of aspects 1-11, wherein the TRE sheath has a thermal conductivity of between 5 W/mK and 400 W/mK.

13. The wellbore of aspects 1-12, wherein the TRE sheath is configured to be flexible for movement with subsurface rock.

14. The wellbore of aspects 1-13, wherein the TRE sheath has a permeability of equal or less than 10 Darcy.

15. The method of aspects 1-14, wherein the step of settling and/or consolidating takes at least 24 hours to form the TRE sheath.

16. The method of aspects 1-15, wherein the step of pumping is done in a staged manner.

17. The method of aspects 1-16, wherein the TRE mixture has a high concentration of TRE particles.

18. The method of aspect 17, wherein the TRE mixture with the higherconcentration of TRE particles is pumped in one stage and does not need to settle.

19. The method of aspect 1, wherein the TRE particles are present in the TRE mixture in an amount greater than 50 wt % of the total weight of the TRE mixture.

20. A method of placing a TRE sheath into a wellbore, comprising: feeding a TRE mixture comprising a plurality of thermal reach enhancement (TRE) particles and a carrier fluid that suspends the particles into an annular space between a liner and a wellbore wall using a top job process; settling and consolidating the TRE particles in the annular space; wherein the feeding and consolidating is performed over at least two cycles to thereby form a compacted TRE sheath in a target zone of the annular space.

21. The method of aspect 20, wherein the top job process comprises inserting a small tube directly into the annular space, pumping a wash fluid through the small tube to clean residual fluids, and pumping the TRE mixture into the small tube to fill the annular space.

22. The method of aspects 20-21, wherein consolidating the TRE mixture comprises hydraulic consolidation and/or chemical consolidation.

23. The method of aspects 20-22, wherein the carrier fluid comprises a high apparent viscosity carrier fluid with a composition that allows an additive or triggering event to change physical and/or chemical properties of the mixture in situ to thereby reduce viscosity and thereby allow the TRE particles to settle via gravity at a target location.

24. The method of aspects 20-23, wherein the plurality of TRE particles is selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and optionally wherein the thermally conductive material comprises at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy.

25. The method of aspects 20-24 wherein the TRE sheath is placed at a depth of between 150 m and 20,000 m below the surface.

26. The method of aspects 20-25 wherein the TRE sheath is placed at a location with a geostatic temperature of between 120° C. and 600° C.

27. The method of aspects 20-26 wherein the TRE sheath has a vertical length of between 10 m and 10,000 m.

28. The method of aspect 21, wherein once a TRE sheath is formed, removing the small tube from the annular space.

29. The method of aspects 20-28, wherein the step of feeding and/or consolidating is performed until the TRE sheath covers at least 10% of the vertical height of the wellbore.

30. The method of aspects 20-29, wherein the TRE sheath is configured to be flexible for movement with subsurface rock.

31. The method of aspects 20-30, wherein forming the compacted TRE sheath takes between 12 and 72 hours.

32. The method of aspects 20-31, wherein the TRE sheath has a thermal conductivity of between 5 W/mK and 400 W/mK.

33. The method of aspects 20-32, wherein the TRE sheath has a permeability of equal or less than 10 Darcy.

34. A method of placing a TRE sheath into a wellbore, comprising: feeding a TRE mixture comprising a plurality of thermal reach enhancement (TRE) particles and a carrier fluid that suspends the particles into an annular space using a perf and plug process and allowing the TRE particles to settle in the annular space; wherein the perf and plug process comprises pumping the TRE mixture into the annular space through a perforated casing; and wherein the feeding and settling is performed over at least two cycles to thereby form the TRE sheath in a target zone of the annular space.

35. The method of aspect 34, wherein the carrier fluid comprises a high apparent viscosity carrier fluid with a composition that allows an additive or triggering event to change physical and/or chemical properties of the mixture in situ to thereby reduce viscosity and thereby allow the TRE particles to settle via gravity at a target location.

36. The method of aspects 34-35, wherein the perf and plug process further comprises removing the carrier fluid from the TRE mixture.

37. The method of aspects 34-36, wherein the perf and plug process further comprises plugging the perforated tube with cement.

38. The method of aspects 34-37, wherein allowing the TRE particles to settle further comprises consolidation of the TRE particles by hydraulic consolidation and/or chemical consolidation.

39. The method of aspects 34-38, wherein the plurality of TRE particles is selected from the group consisting of zinc, graphite, graphene, tungsten, aluminum, silicon carbide, aluminum nitride, silicon nitride, boron nitride, gold, copper, silver, diamond, aluminum, aluminum oxides, rhodium, zinc, cobalt, copper alloys, nickel, iron, platinum, palladium, tin, steel, zirconium, titanium, carbon fiber, carbon black, and Hastelloy, and optionally wherein the thermally conductive material comprises at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy.

40. The method of aspects 34-39, wherein the TRE sheath is configured to be flexible for movement with subsurface rock.

41. The method of aspects 34-40, wherein allowing the TRE particles to settle comprises at least 24 hours.

42. The method of aspects 34-41, wherein the TRE sheath has a thermal conductivity of between 5 W/mK and 400 W/mK.

43. The method of aspects 34-42, wherein the TRE sheath has a permeability of equal or less than 10 Darcy.

44. A method of forming a high-thermal conductivity compacted TRE sheath around a liner that is disposed in a wellbore at a target location within a geological formation, comprising: installing a liner in the wellbore to form a first annular space, wherein the first annular space exists between the liner and the wellbore wall and begins at the bottom of the wellbore; attaching a tieback to an upper end of the liner to form a second annular space, wherein the second annular space exists between the tie back and the wellbore wall, and begins where the tie back and liner are attached; wherein the first annular space is fluidly coupled to the second annular space; feeding a TRE mixture, comprising a plurality of thermal reach enhancement (TRE) particles and a high apparent viscosity carrier fluid that suspends the particles, through the second annular space into the first annular space to a height above the liner and below an upper end of the tie back; breaking viscosity of the mixture; waiting for a time sufficient to allow TRE particles to settle around the liner to thereby form a settled particle sheath; consolidating the settled particle sheath via hydraulic consolidation and/or chemical consolidation, to thereby form a compacted TRE sheath; and optionally removing the tie back.

45. The method of aspect 44, further comprising repeating the step of installing, the step of attaching, the step of placing, the step of breaking, the step of waiting, the step of consolidating, and/or the step of removing until the compacted TRE sheath around the liner covers at least 10% of the vertical height of the liner.

46. The method of aspects 44-45, wherein the liner and tieback is replaced with a casing.

47. The method of aspects 44-46, wherein the target location is at a depth of between 150 m and 20,000 m.

48. The method of aspects 44-47, wherein the wellbore in the target location extends in a substantially vertical orientation.

49. The method of aspects 44-48, wherein the target location has a geostatic temperature of between 120° C. and 600° C.

50. The method of aspects 44-49, wherein a flow path for the mixture comprises the first annular space around the liner and the second annular space around the tie back.

51. The method of aspect 50, wherein the flow path has a length of at least 500 m.

52. The method of aspects 44-51, wherein feeding the suspension requires conventional pumping, or reverse pumping, or top job pumping, or pumping with a control line.

53. The method of aspects 44-52, wherein the tie back has a vertical length of between 10 m and 5,000 m.

54. The method of aspects 44-53, wherein the liner has a vertical length of between 10 m and 5,000 m.

55. The method of aspects 44-54, wherein pumping the mixture through the second annular space into the first annular space occurs at least once.

56. The method of aspects 44-55, wherein breaking the mixture allows the plurality of particles to settle within 24 hours around the liner.

57. The method of aspects 44-56, wherein the settled particle sheath around the liner covers between 60% and 100% of the perimeter of the liner.

58. The method of aspects 44-57, wherein the settled particle sheath has a vertical length of between 10% and 100% of the total length of the liner.

59. The method of aspects 44-58, wherein the settled particle sheath is consolidated to form a compacted TRE sheath with a final porosity of equal or less than 80%.

60. The method of aspects 44-59, wherein hydraulic consolidation is performed by draining and/or pumping the carrier fluid of the suspension away from the settled particle sheath and/or applying an effective stress of at least 15 psi to the settled particle sheath.

61. The method of aspects 44-60, wherein the compacted TRE sheath has a permeability of equal or less than 0.01 Darcy.

62. The method of aspects 44-61, wherein the geological formation includes a plurality of thermal reach enhancement (TRE) structures that are at least partially filled with a high-thermal conductivity material, and wherein the high-thermal conductivity material in the TRE structures is thermally coupled with the settled TRE solid in the wellbore.

63. The method of aspect 62, wherein the TRE structures have a wedge-shaped configuration in which a mouth of the TRE structures is wider than a distal end of the TRE structures.

64. The method of aspects 44-63, wherein the step of installing a liner, and/or the step of attaching a tie back, and/or the step of feeding the mixture, and/or the step of breaking viscosity of the suspension to allow settling, and/or the step of waiting for the particles to settle, and/or the step of consolidating, and/or the step of removing the tie back is repeated at least twice.

65. A fluid removal enhancement (FRE) structure, comprising: a system configured to separate a carrier fluid from a plurality of settled TRE particles previously suspended by the carrier fluid; wherein the plurality of settled TRE particles are disposed in an annular space between a wall of a geothermal and a casing or liner; wherein the system is configured to be fluidly coupled to an interstitial network between the settled TRE particles and fluidly coupled to a space outside the settled TRE particles to allow removing of the carrier fluid from the interstitial network to the space outside; and wherein removal of the carrier fluid enhances consolidation of the settled TRE particles.

66. The FRE structure of aspect 65, wherein the system comprises a partially perforated tubing or a casing with continuous axial grooves.

67. The FRE structure of aspect 66, wherein the partially perforated tubing or the casing with continuous axial grooves is disposed in a wellbore that descends substantially vertically from a topside location to a target location in a geological formation.

68. The FRE structure of aspects 65-67, wherein the system is part of a geological formation and allows draining of the carrier fluid into the formation via voids, pores, vugs, joints, a fracture, or a fault in the formation.

69. The FRE structure of aspects 65-68, wherein perforations are made longitudinally along a tubing prior to disposal into the geothermal well and/or wellbore.

70. The FRE structure of aspects 65-69, wherein the settled TRE particles have a porosity of equal or less than 80%.

71. The FRE structure of aspects 65-70, wherein the settled TRE particles form a high thermal conductivity sheath with a thermal conductivity of between 5 W/mK and 400 W/mK.

72. A wellbore comprising a vertically or substantially vertically multi-segmented TRE sheath, wherein at least two segments comprise a settled and compacted solid phase of a TRE mixture comprising a plurality of suspended thermal reach enhancement (TRE) particles and a carrier fluid that suspends the particles.

73. The wellbore of aspect 72, wherein the multi-segmented TRE sheath is fluidly coupled to a proximal mouth portion of a thermal reach enhancement (TRE) structure that extends from the wellbore distally into a geological formation at a target location.

74. The wellbore of aspects 72-73, wherein the carrier fluid comprises a high apparent viscosity carrier fluid with a composition that allows an additive or triggering event to change physical and/or chemical properties of the mixture in situ to thereby reduce viscosity and thereby allow the TRE particles to settle via gravity at a target location.

75. The wellbore of aspects 72-74, wherein the plurality of TRE particles is selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and optionally wherein the thermally conductive material comprises at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy.

76. The wellbore of aspects 72-75, wherein the settled and compacted solid phase of the TRE mixture is achieved after between 12 and 72 hours.

77. The wellbore of aspects 72-76 wherein the TRE sheath is placed at a depth of between 150 m and 20,000 m below the surface.

78. The wellbore of aspects 72-77 wherein the TRE sheath is placed at a location with a geostatic temperature of between 120° C. and 600° C.

79. The wellbore of aspects 72-78 wherein the TRE sheath has a vertical length of at between 10 m and 10,000 m.

80. The wellbore of aspects 72-79, wherein the TRE sheath has a thermal conductivity of between 5 W/mK and 400 W/mK.

81. The wellbore of aspects 72-80, wherein the TRE sheath is configured to be flexible for movement with subsurface rock.

82. The wellbore of aspects 72-81, wherein the TRE sheath has a permeability of equal or less than 10 Darcy.

In some embodiments, the numbers expressing quantities of ingredients, properties such as concentration, reaction conditions, and so forth, used to describe and claim certain embodiments of the invention are to be understood as being modified in some instances by the term "about." As used herein, the terms "about" and "approximately", when referring to a specified, measurable value (such as a parameter, an amount, a temporal duration, and the like), is meant to encompass the specified value and variations of and from the specified value, such as variations of +/−10% or less, alternatively +/−5% or less, alternatively +/−1% or less, alternatively +/−0.1% or less of and from the specified value, insofar as such variations are appropriate to perform in the disclosed embodiments. Thus, the value to which the modifier "about" or "approximately" refers is itself also specifically disclosed. The recitation of ranges of values herein is merely intended to serve as a shorthand method of referring individually to each separate value falling within the range. Unless otherwise indicated herein, each individual value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise. As also used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification or claims refer to at least one of something selected from the group consisting of A, B, C . . . and N, the text should be interpreted as requiring only one element from the group, not A plus N, or B plus N, etc.

What is claimed is:

1. A method of placing a thermal reach enhancement (TRE) sheath into a geothermal wellbore, comprising:
    feeding a TRE mixture comprising a plurality of TRE particles and a carrier fluid that suspends the particles into an annular space between a liner and a wellbore wall using a top job process;
    wherein the TRE particles have a thermal conductivity of at least 5 W/mK;
    settling and consolidating the TRE particles in the annular space;
    wherein consolidating the TRE particles comprises hydraulic consolidation and/or chemical consolidation; and
    wherein the feeding and consolidating are performed over at least two cycles to thereby form a compacted TRE sheath in a target zone of the annular space.

2. The method of claim 1, wherein the top job process comprises inserting a small tube directly into the annular space, pumping a wash fluid through the small tube to clean residual fluids, and pumping the TRE mixture into the small tube to fill the annular space, and/or wherein once a TRE sheath is formed, removing the small tube from the annular space.

3. The method of claim 1, wherein the step of feeding and/or consolidating is performed until the TRE sheath covers at least 10% of a vertical height of the wellbore.

4. The method of claim 1, wherein forming the compacted TRE sheath takes between 12 and 72 hours.

5. The method of claim 1, wherein the TRE sheath is placed at a depth of between 150 m and 20,000 m below the surface, and/or the TRE sheath is placed at a location with a geostatic temperature of between 120° C. and 600° C., and/or wherein the TRE sheath has a vertical length of between 10 m and 10,000 m, and/or wherein the TRE sheath is configured to be flexible for movement with subsurface rock, and/or wherein the TRE sheath has a thermal conductivity of between 5 W/mK and 400 W/mK, and/or wherein the TRE sheath has a permeability of equal or less than 10 Darcy.

6. A method of placing a compacted multi-segmented thermal reach enhancement (TRE) sheath into a geothermal wellbore in stages, comprising:
    pumping a TRE mixture into an annular space of the wellbore;
    wherein the TRE mixture comprises a plurality of TRE particles and a carrier fluid that suspends the particles;
    wherein the TRE particles have a thermal conductivity of at least 5 W/mK;
    settling the TRE particles in the annular space of the wellbore;
    optionally removing the carrier fluid from the TRE mixture;
    consolidating the TRE particles to thereby form a thermally conductive and compacted TRE sheath in the wellbore;
    wherein consolidating the TRE particles comprises hydraulic or chemical consolidation; and
    wherein pumping the TRE mixture, and/or settling the TRE mixture, and/or removing the carrier fluid, and/or consolidating the TRE particles is repeated in at least two stages.

7. The method of claim 6, wherein pumping the TRE mixture uses a forward circulation process, a reverse circulation process, a casing movement process, a top-job process, or an external tubing process, and/or wherein the method of placing a TRE sheath in stages uses a differential valve process, a perf-and-plug process, a liner/tie-back process, a sedimentation process, or an external tubing process, and/or wherein a cement mixture follows placement of the TRE mixture as a tail to seal the annular space, and/or wherein removing the carrier fluid uses an external tubing process, a stimulation-based process, a vaporization process, a grooved casing process, or a casing vibration process.

8. The method of claim 6, wherein the plurality of TRE particles is selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and optionally wherein the TRE particles comprise at least two chemically distinct particles selected from the group consisting of zinc, graphite, graphene, tungsten, aluminum, silicon carbide, aluminum nitride, silicon nitride, boron nitride, gold, copper, silver, diamond, aluminum alloys, aluminum oxides, rhodium, zinc, cobalt, copper alloys, nickel, iron, platinum, palladium, tin, steel, zirconium, titanium, carbon fiber, carbon black, and Hastelloy, and/or wherein the carrier fluid comprises water or fluid carbon dioxide, and/or wherein the carrier fluid is a high apparent viscosity fluid with a composition that allows an additive or triggering event to change physical and/or chemical properties of the mixture in situ to thereby reduce viscosity and allow the TRE particles to settle via gravity.

9. The method of claim 6, wherein the TRE sheath is placed at a depth of between 150 m and 20,000 m below the surface, and/or wherein the TRE sheath is placed at a location with a geostatic temperature of between 120° C. and 600° C.; and/or wherein the TRE sheath has a vertical length of between 10 m and 10,000 m, and/or wherein the TRE sheath has a thermal conductivity of between 5 W/mK and 400 W/mK, and/or wherein the TRE sheath is configured to be flexible for movement with subsurface rock, and/or wherein the TRE sheath has a permeability of equal or less than 10 Darcy.

10. The method of claim 6, wherein the TRE mixture has an increased concentration of the TRE particles, and/or wherein the TRE mixture with the increased concentration of TRE particles is pumped in one stage and does not need to settle.

* * * * *